US011402723B2

(12) United States Patent
Lukens et al.

(10) Patent No.: US 11,402,723 B2
(45) Date of Patent: Aug. 2, 2022

(54) GAIN BALANCED NONLINEAR OPTICAL INTERFEROMETER

(71) Applicant: UT-Battelle, LLC, Oak Ridge, TN (US)

(72) Inventors: Joseph M. Lukens, Knoxville, TN (US); Nicholas A. Peters, Knoxville, TN (US); Raphael C. Pooser, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/926,190

(22) Filed: Jul. 10, 2020

(65) Prior Publication Data

US 2020/0341347 A1 Oct. 29, 2020

Related U.S. Application Data

(62) Division of application No. 16/408,945, filed on May 10, 2019, now Pat. No. 10,725,360.

(60) Provisional application No. 62/669,470, filed on May 10, 2018.

(51) Int. Cl.
*G02F 1/39* (2006.01)
*G02F 1/35* (2006.01)

(52) U.S. Cl.
CPC ............. *G02F 1/39* (2013.01); *G02F 1/3501* (2013.01); *G02F 1/3544* (2013.01); *G02F 1/3507* (2021.01); *G02F 1/392* (2021.01); *G02F 2203/13* (2013.01)

(58) Field of Classification Search
CPC .......... G02F 1/3501; G02F 1/3544; G02F 1/39
See application file for complete search history.

(56) References Cited

U.S. PATENT DOCUMENTS

| 3,816,754 A | 6/1974 | Hodgson et al. |
| 5,504,763 A | 4/1996 | Bischel et al. |
| 6,078,597 A | 6/2000 | Feuer |
| 7,061,960 B2 | 6/2006 | Krupke |
| 9,246,624 B1 | 1/2016 | Yang et al. |
| 9,270,076 B2 | 2/2016 | Takasaka et al. |

(Continued)

OTHER PUBLICATIONS

Chekhova et al., "Nonlinear interferometers in quantum optics," *Advances in Optics and Photonics*, 8:104-155 (Mar. 2016).

(Continued)

*Primary Examiner* — Daniel Petkovsek
(74) *Attorney, Agent, or Firm* — Klarquist Sparkman, LLP

(57) ABSTRACT

A nonlinear fiber interferometer is disclosed suitable for fiber sensor and other applications. A first nonlinear fiber section amplifies probe and conjugate sidebands of a pump through four-wave mixing. A second section introduces a phase shift to be measured, for example from a sensor. A third nonlinear fiber section amplifies with phase-sensitive gain to increase signal-to-noise ratio. Based on phase-sensitive output power of probe and/or conjugate components, the phase shift can be measured. Superior performance can be obtained by balancing gain between the (first and third) nonlinear sections. Non-fiber, for example photonic integrated circuit, embodiments are disclosed. Differential sensing, alternative detection schemes, sensing applications, associated methods, and other variations are disclosed.

20 Claims, 12 Drawing Sheets

(56) References Cited

U.S. PATENT DOCUMENTS

| | | | |
|---|---|---|---|
| 9,837,788 B2* | 12/2017 | Akasaka | H04B 10/2916 |
| 10,605,727 B2 | 3/2020 | Lukens et al. | |
| 10,725,360 B2* | 7/2020 | Lukens | G02F 1/3501 |
| 2006/0285197 A1 | 12/2006 | McKinstrie | |
| 2009/0190207 A1 | 7/2009 | Watanabe | |
| 2016/0359569 A1 | 12/2016 | Dailey et al. | |
| 2017/0214474 A1 | 7/2017 | Dailey et al. | |
| 2017/0315054 A1 | 11/2017 | Lukens et al. | |
| 2019/0214782 A1 | 7/2019 | Akasaka et al. | |
| 2019/0346739 A1 | 11/2019 | Lukens et al. | |

OTHER PUBLICATIONS

Culshaw et al., "Fiber-Optic Sensing: A Historical Perspective," *Journal of Lightwave Technology*, 26(9):1064-1078, (May 2008).

Donley et al., "Double-pass acousto-optic modulator system," *Rev. Sci. Instrum.*, 76:063112-1-063112-6 (2005).

Fang et al., "Experimental implementation of a nonlinear beamsplitter based on a phase-sensitive parametric amplifier," *Appl. Phys. Lett.*, 108:131106-1-131106-4 (2016).

Fu et al., "Phase-sensitive four-wave mixing interferometer," *Optics Letters*, 39:4427-4430 (Aug. 1, 2014).

Giese et al., "Phase sensitivity of gain-unbalanced nonlinear interferometers," arXiv:1712.06226v2, pp. 1-11 (Nov. 2017) (also published as Giese et al., "Phase sensitivity of gain-unbalanced nonlinear interferometers," *Physical Review* A, 96, 053863 (2017)).

Herzog et al., "Frustrated Two-Photon Creation via Interference," *Physical Review Letters*, 72:629-632 (Jan. 1994).

Hudelist et al., "Quantum metrology with parametric amplifier-based photon correlation interferometers," *Nature Commun.*, 5:3049:1-6 (Jan. 2014).

International Preliminary Report on Patentability from International Application No. PCT/US2017/030200, dated Oct. 30, 2018, 10 pages.

International Search Report and Written Opinion from International Application No. PCT/US2017/030200, dated Jul. 31, 2017 13 pages.

Jing et al., "Realization of a nonlinear interferometer with parametric amplifiers," *Appl. Phys. Lett.*, 99:011110-1-011110-3 (2011).

Kong et al., "Experimental investigation of the visibility dependence in a nonlinear interferometer using parametric amplifiers," *Appl. Phys. Lett.*, 102:011130-1011130-4 (2013).

Lee et al, "Interferometric Fiber Optic Sensors," *Sensors*, 12:2467-2486 (2012).

Li et al., "Effect of input phase modulation to a phase-sensitive optical amplifier," *Opt. Express*, 24:19871-19880 (Aug. 2016).

Liu et al., "Quantum enhanced joint measurement of multiple non-commuting observables with SU(1,1) interferometer," arXiv:1712.01553v2, pp. 1-6 (Dec. 2017).

Lukens et al., "A naturally stable Sagnac-Michelson nonlinear interferometer," *Phys. Rev. A*, accepted author manuscript, pp. 1-5 (Nov. 2016) (also published as Lukens et al., "A naturally stable Sagnac-Michelson nonlinear interferometer," *Optics Letters*, 41(23):5438-5441 (Oct. 2016)).

Lukens et al., "A Broadband Fiber-optic Nonlinear Interferometer," *Applied Physics Letters*, 113:091103-1-091103-5 (Aug. 2018).

Manceau et al., "Detection loss tolerant supersensitive phase measurement with an SU(1,1) interferometer," arXiv:1705.02662v2, pp. 1-8 (Jun. 2017) (also published as Manceau et al., "Detection loss tolerant supersensitive phase measurement with an SU(1,1) interferometer," *Phys. Rev. Lett.*, 119(22):1-8, 223604 (2017)).

Marino et al., "Effect of losses on the performance of an SU(1,1) interferometer," *Phys. Rev. A*, 86:023844-1-023844-8 (2012).

Neo et al., "Phase-sensitive amplification of light in a $\chi^{(3)}$ photonic chip using a dispersion engineered chalcogenide ridge waveguide," *Opt. Express*, 21:7926-7933 (Apr. 2013).

Ou, Z. Y., "Enhancement of the phase-measurement sensitivity beyond the standard quantum limit by a nonlinear interferometer," *Phys. Rev. A*, 85:023815-1-023815-7 (Feb. 2012).

Puck, et al., "Coherent-light-boosted, sub-shot noise, quantum Interferometry," *New Journal of Physics*, 12:1-9, 083014 (2010).

Slavík et al., "Processing of optical combs with fiber optic parametric amplifiers," *Optics Express*, 20(9):10059-10070 (Apr. 2012).

Tong et al., "Towards ultrasensitive optical links enabled by low-noise phase-sensitive amplifiers," *Nature Photonics*, 5:430-436 (Jun. 2011).

Tong et al., "Ultralow Noise, Broadband Phase-Sensitive Optical Amplifiers, and Their Applications," *IEEE Journal of Selected Topics in Quantum Electronics*, 18(2):1016-1032 (Mar./Apr. 2012).

Tong et al., "Low-noise optical amplification and signal processing in parametric devices," *Adv. Opt. Photon.*, 5:318-384 (Aug. 2013).

Wang et al., "Experimental implementation of phase locking in a nonlinear interferometer," *App. Phys. Lett.*, 107:121106-1-121106-5 (2015).

Xin et al., "The effect of losses on the quantum-noise cancellation in the SU(1,1) interferometer," *Appl. Phys. Lett.*, 109:051107-1-051107-4 (2016).

Yurke et al., "SU(2) and SU(1,1) interferometers," *Phys. Rev. A*, 33:4033-4054 (Jun. 1986).

Zhang et al., "Phase-sensitive amplification in silicon photonic crystal waveguides," *Opt. Lett.*, 39:363-366 (Jan. 2014).

\* cited by examiner

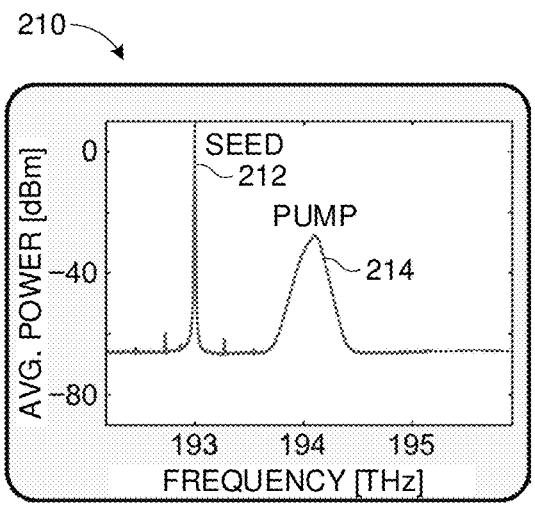
FIG. 2A
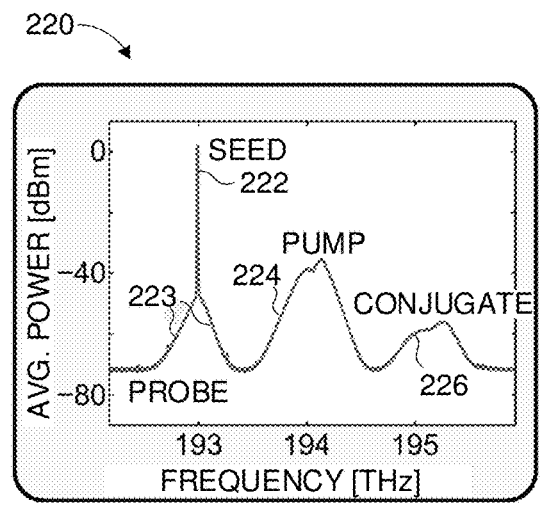
FIG. 2B
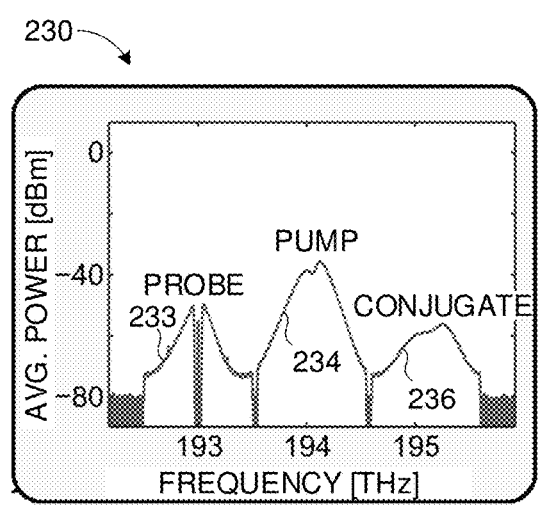
FIG. 2C
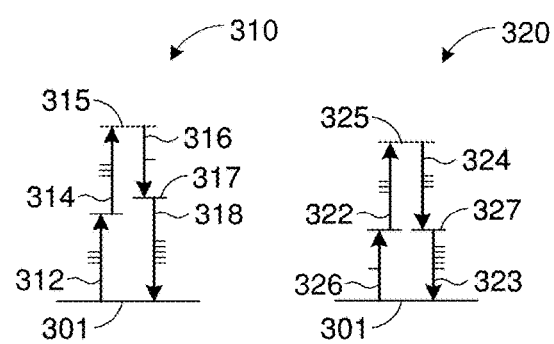
FIG. 3A  FIG. 3B

GAIN BALANCED NONLINEAR OPTICAL INTERFEROMETER

CROSS-REFERENCE TO RELATED APPLICATIONS

This application is a Divisional of U.S. patent application Ser. No. 16/408,945, filed May 10, 2019, which claims the benefit of U.S. Provisional Application No. 62/669,470, filed May 10, 2018, both of which applications are incorporated herein by reference in their entirety.

ACKNOWLEDGMENT OF GOVERNMENT SUPPORT

This invention was made with government support under Contract No. DE-AC05-00OR22725 awarded by the U.S. Department of Energy. The government has certain rights in the invention.

BACKGROUND

A wide range of optical sensing applications are known. Commonly, a medium in an optical device has a property (e.g., refractive index) which is sensitive to an external parameter (e.g., temperature). Light propagating in the medium can experience a change in a detectable property (e.g., phase) which can be measured outside the optical device, sometimes at a considerable distance, to infer a value of the sensed parameter.

Some applications can be limited by performance, e.g. a sensed parameter cannot be measured with a desired resolution because of noise. Some applications can be limited by complexity, for example, a requirement for a high-power laser with its attendant power and cooling systems, or assorted auxiliary devices to compensate for various confounding effects both within an optical sensing apparatus (e.g., scattering) or due to external influences (e.g., mechanical vibration).

Accordingly, there remains ample opportunity for improvements in optical sensing.

SUMMARY

Apparatus and methods are disclosed for optical devices, such as interferometers, having two gain-balanced nonlinear stages, each in a fiber or other nonlinear lightguide. Between the two nonlinear stages, a phase shift can be applied on a given light component. The phase shift can be detected following phase-sensitive gain in the second nonlinear stage. The phase-sensitive gain can be due to a determinate phase relationship between several light components as developed in the first nonlinear lightguide, and a variation in that phase relationship by the applied phase shift. The applied phase shift can represent a sensed quantity, such as from an optical sensor, and the disclosed technology can be used for optical sensing in diverse applications.

According to one aspect, the disclosed technologies can be implemented as an optical device incorporating a first nonlinear lightguide, a modulator, and a second nonlinear lightguide. The first nonlinear lightguide has a first length, and is situated to receive seed probe light and pump light from respective lamps. The first nonlinear lightguide is configured to form first mixed light having probe, pump, and conjugate light components. The probe light has a probe gain in the first nonlinear lightguide.

The modulator is situated to receive at least a given component of the first mixed light from the first nonlinear lightguide and to provide the given component to a second nonlinear waveguide, with incorporation of a phase shift representative of a sensed quantity.

The second nonlinear lightguide has a second length, and is situated to receive second mixed light comprising second probe, second pump, and second conjugate components, including the phase-shifted given component. The second nonlinear lightguide is configured to amplify the second probe and second conjugate components with phase-sensitive gain. The first length or the second length of the respective nonlinear lightguides is chosen so that averaged phase-sensitive gain matches the probe gain in the first nonlinear lightguide.

In some examples, a disclosed optical device can also include a photodetector coupled to an output of the second nonlinear lightguide and configured to measure the second probe component or the second conjugate component to determine a phase. Further examples can include a controlled phase shifter coupled to the photodetector, and situated in a path of one of the components of the first mixed light, between the first and second nonlinear lightguides.

In additional examples, the optical device can be included in an optical sensing system, together with a first laser providing the seed probe light is received, and a second laser providing the pump light. An intrinsic fiber sensor can be sensitive to a parameter and can provide phase shift responsive to variations in the parameter. The intrinsic fiber sensor can be coupled to the modulator of such a system. Installed on-board an aircraft, such a system and coupled sensor can monitor a parameter of the aircraft, as an airborne monitoring system. Similarly, such a system and coupled sensor can monitor an environmental parameter of a petrochemical access shaft, as a down-hole environmental monitoring system.

In further examples, an output of the photodetector can be coupled to a circuit configured to transform the measured phase into a representation of the sensed quantity, and the disclosed technology can be an optical sensor. In varying examples, the sensed quantity can be one or more of: temperature, strain, pressure, or angular velocity; and the phase shift can be incorporated into the given component by an intrinsic fiber sensor that is sensitive to the sensed quantity. Particularly, the sensed quantity can be a pressure wave and the optical sensor can be a hydrophone; or the sensed quantity can be an angular velocity and the optical sensor can be a gyroscope.

In some examples, at least one of the first or second nonlinear lightguides can be an optical fiber, or at least one of the first or second nonlinear lightguides can be a waveguide in a planar lightwave circuit. The first and second nonlinear lightguides can have matching cross-sectional structure and matching composition. In some examples, the probe gain can be obtained by pump-degenerate four-wave mixing.

In additional examples, the modulator can incorporate a splitter, configured to separate the given component from other components of the first mixed light, and a recombiner configured to merge the given component, with the phase shift incorporated, with other components of the second mixed light. The splitter and recombiner can be implemented as an optical add-drop multiplexer (OADM). In certain examples, the modulator can include a first port, for coupling the given component from the splitter to an external fiber sensor, and a second port for coupling the given component, with the phase shift incorporated, from the external fiber sensor to the recombiner. Other examples can include a fiber sensor situated to transport the given component from the splitter to the recombiner and develop the phase shift in the given component.

In further examples, the seed probe light can be multiplexed between a plurality of wavelengths, the given component of the first mixed light can be correspondingly multiplexed between respective sensors for the plurality of wavelengths, and thereby the sensed quantity can be multiplexed between a respective plurality of quantities detected by the respective sensors.

In a second aspect, the disclosed technologies can be implemented as a method. Seed probe light is amplified by a first gain in a first nonlinear lightguide to form first mixed light having first probe, first pump, and first conjugate components. Second mixed light having second probe, second pump, and second conjugate components is provided to a second nonlinear lightguide. The components of the second mixed light have phase relationships with respective components of the first mixed light. One of the phase relationships is a phase shift associated with a sensed quantity. In the second nonlinear lightguide, the second probe and second conjugate components are amplified with phase-sensitive gain. A length of the first or second nonlinear lightguide is selected to match an average of the phase-sensitive gain with the first gain.

In some examples, a disclosed method can include splitting a given component from other components of the first mixed light, and recombining the given component with the other components, with the recombined given component having incorporated a phase shift associated with the sensed quantity. In additional examples, an intrinsic fiber sensor can receive the split given component, can apply the phase shift responsive to the sensed quantity, and can provide the recombined given component with the incorporated phase shift. In further examples, the seed probe light can be multiplexed between a plurality of wavelengths; and correspondingly the given component can be multiplexed between respective sensing elements for the plurality of wavelengths, so as to multiplex wherein the sensed quantity between a respective plurality of quantities.

A disclosed method can include detecting the second probe component, the second conjugate component, or both to determine the phase shift associated with the sensed quantity. A disclosed method can also include applying an auxiliary phase sweep to a selected one of the second mixed light components to sweep a fringe pattern, and determining a point of the auxiliary phase sweep at which a target point of the fringe pattern is obtained. The determined phase shift can be evaluated as a linear transformation of the determined point of the auxiliary phase sweep. In certain examples, the detecting can be performed with a photosensor, and can include applying a compensatory phase shift to a selected one of the second mixed light components based on feedback from an output of the photosensor, to obtain a target fringe position at the photosensor. The determined phase shift can be evaluated as a linear transformation of the compensatory phase shift.

In a further aspect, the disclosed technologies can be implemented as an optical device incorporating a mode splitter, a modulator, and a mode-coupling amplifier. The mode splitter is configured to split probe and conjugate modes from a pump mode within a nonlinear medium. The modulator is coupled to receive one or more of the modes from the mode splitter at an input port, and to provide the received modes at an output port. A given one of the provided modes is provided with an incorporated phase shift representing a sensed quantity. The mode-coupling amplifier is situated to receive the pump, probe, and conjugate modes, including the given mode coupled from the output port of the modulator. The pump and conjugate modes undergo phase-sensitive gain within the mode-coupling amplifier. The phase-sensitive gain, averaged over values of the phase shift, and a probe gain, experienced by the probe mode within the nonlinear medium, are in a predetermined relationship.

In some examples, the nonlinear medium can be a fiber with third order nonlinear susceptibility, and the splitting can occur due to pump-degenerate four-wave mixing. The splitter and the mode-coupling amplifier can employ a common gain mechanism. The incorporated phase shift can be provided by an external fiber sensor coupled to the modulator, in the path of the given mode.

The foregoing and other objects, features, and advantages of the invention will become more apparent from the following detailed description, which proceeds with reference to the accompanying figures.

BRIEF DESCRIPTION OF THE DRAWINGS

FIGS. 2A-2C are graphs showing optical spectra at different positions within an example optical device according to disclosed technologies.

FIGS. 3A-3B are illustrations of four-wave mixing processes employed in some embodiments of the disclosed technologies.

DETAILED DESCRIPTION

Introduction

Figure 1:
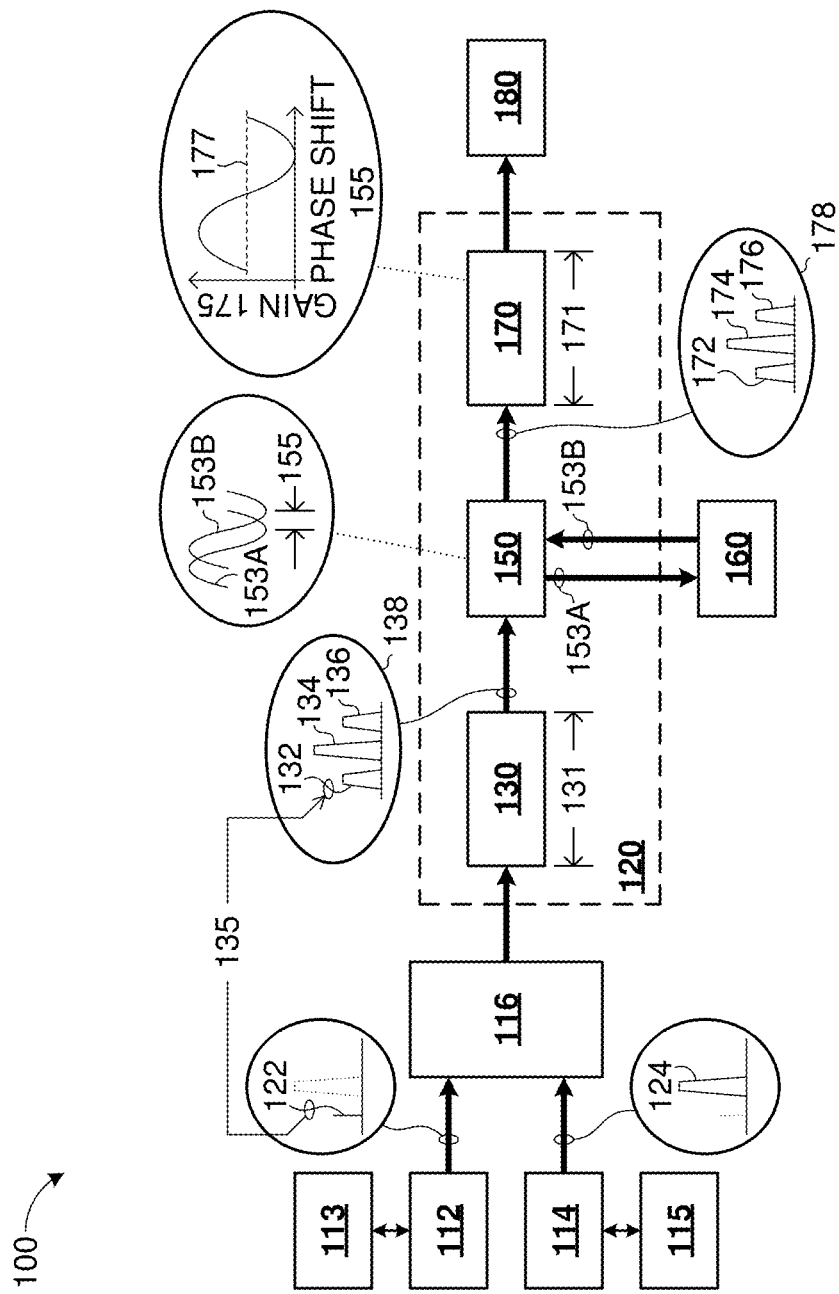
FIG. 1 is a block diagram of an example optical device according to disclosed technologies.

Fiber sensors can be used in a wide range of applications, ranging from in-flight gyroscopes, to monitoring in rugged environments such as oil wells and nuclear power plants, to detection of gravity waves. Fiber sensors can be used to detect acoustic waves, temperature, mechanical strain, or chemicals. Increasingly, photolithography, epitaxy, and related technologies are being deployed to develop optical systems as photonic integrated circuits (PIC). Both fiber and PIC technologies offer advantages of mechanical stability, system simplicity (e.g. low count of optical devices in a practical system), and ready integration with other fiber or PIC devices, especially compared with prior systems employing $^{85}$Rb vapor and geometric optics. PIC in particular can be very compact.

Many sensing applications can be limited in performance by signal-to-noise ratio (SNR), namely the difficulty of detecting a signal that is weak in relation to background noise. Additionally, in many traditional signal chains, each successive component adds its own noise figure, meaning that SNR can progressively deteriorate as the signal is amplified and processed.

Parametric amplification can provide nonlinear gain, so that a signal 3 dB above a noise floor can be amplified by a greater amount than the noise, meaning that SNR can actually be increased. Because signal+noise can be greater than noise by itself, an increase in SNR can be had even if the signal is buried well below the noise floor. Conventionally, SNR can often be limited by shot noise, where a fractional error in a measurement can be proportional to $N^{-0.5}$ for N detected photons. Through nonlinear amplification, it becomes possible to operate with scaling between $N^{-0.5}$ and the ultimate Heisenberg limit $N^{-1}$. The ability to operate beyond the shot noise limit is sometimes termed quantum enhancement, and is sometimes described as cancellation of correlated noise. The improved SNR can exceed that of any linear interferometer and can enable previously infeasible measurement applications. In some examples of the disclosed technologies, nonlinear gain can be provided by four-wave mixing, amplifying probe and conjugate sidebands of a pump wavelength.

However, nonlinear amplifiers can have their own limitations. Particularly, competing nonlinear processes can significantly deteriorate SNR, visibility, sensitivity, or another figure of merit. In other words, nonlinear amplification can pull a signal out of pre-existing noise, but could simultaneously introduce vastly greater noise through a competing nonlinear process. Some examples of competing processes can include self-phase modulation (SPM) which can lead to super-continuum generation, cross-phase modulation (XPM), stimulated Brillouin scattering (SBS), or stimulated Raman scattering (SRS). Nonlinear process can also saturate. Thus, careful design of a nonlinear interferometer can be required to optimize performance: it can be insufficient to merely maximize gain of a desired nonlinear process.

Particularly, the present authors have discovered that for a particular class of two-stage nonlinear interferometers, superior performance can be achieved by balancing. In simplified terms, an unequal gain distribution between the two stages means that the higher gain stage can be more susceptible to competing deleterious nonlinear effects, limiting performance either directly or indirectly. For this reason, gain balanced stages can offer best overall gain, best SNR, best sensitivity, best fringe visibility, or best performance according to some other figure of merit, among competing system designs. The authors have conducted experiments, verified noise performance, and confirmed their results with simulations, as described further herein.

Embodiments of the disclosed technologies can combine gain balancing with the advantages of lightguide optics and nonlinear amplification to achieve high-sensitivity, low-complexity, and compact instruments that enable or advance many optical sensing applications. Such instruments can be well-suited for room temperature or elevated temperature operation, and challenging environments with vibration, electromagnetic interference, dirt, contamination, remote access, or various kinds of loss: lossy environments can be mitigated by the guided optics, while intrinsic optical path losses can be mitigated by the SNR enhancement.

Terminology

To facilitate review of the various embodiments, the following explanations of terms are provided. Occasionally, and where clear from the context, a term may also be used in a different meaning.

As used herein, the term "airborne" refers to any apparatus installed in an aircraft.

As used herein, an "aircraft" refers to a man-made apparatus capable of controlled flight through air or space. Aircraft can include airplanes, airships, drones, gliders, helicopters, or satellites. A baseball offers no capability for controlling flight once in flight and would not be considered an aircraft. However gliders, with movable flaps, and some missiles, with engine control, can be regarded as aircraft.

As used herein, "amplification" can refer to a process that increases the power of an optical or electrical signal, or to the ensuing gain in signal magnitude.

As used herein, an "amplifier" is a device for increasing the power of an optical or electrical signal. Some amplifiers can be generally linear within their normal operating conditions, meaning that doubling the magnitude of an input signal (measured as power, electric fields, voltage, or current) can double the magnitude of an output signal (measured similarly). Common electrical signal amplifiers described herein can be linear amplifiers. Some amplifiers can be nonlinear within their normal operating conditions, for which a doubling of input signal magnitude more than doubles the output signal magnitude. Common optical signal amplifiers described herein can be nonlinear parametric amplifiers based on four-wave mixing. Other nonlinear amplifiers can exhibit saturation behavior, where a doubling of input signal magnitude can yield an increase in output signal magnitude by less than a factor of two. An optical signal amplifier can provide employ optical-electrical-optical (O/E/O) conversion to provide gain in the electrical domain. As used herein, a "parametric" amplifier provides optical amplification through a nonlinear process, such as four-wave mixing.

As used herein, an "arrayed waveguide grating" (AWG) is an optical device incorporating an array of optical waveguides by which the AWG provides wavelength dependent performance. Common AWGs can be planar devices, and can be used for multiplexing, demultiplexing, or filtering.

As used herein, the term "average," without qualification, refers to an arithmetic mean. The average can be over a finite set of items, over a finite range, or over a period of a periodic function. Where "average" is used to describe a feature of an example of the disclosed technologies, other central measures can alternatively be used, including a geometric mean, a harmonic mean, a weighted mean, a median, or a mode.

As used herein, a "circuit" is an electrical circuit, i.e. an apparatus within which electrical charge can move. Some common circuits perform functions on signals.

As used herein, a "circulator" is a non-reciprocal optical device having at least three ports. Light of a given wavelength entering at port #1 can primarily emerge at port #2, however light of the given wavelength entering at port #2 does not primarily emerge at port #1. Often, light entering at port #3 can primarily emerge at port #1. As used herein, "coherence" refers to a fixed phase relationship between an electric field of light at one space-time point and another space-time point. Temporal coherence refers to the electric field phase at one space-time point being determinate from the electric field phase at the same spatial position at a different time. Spatial coherence can refer to transverse spatial coherence, namely the electric field phase being predictable in a direction transverse to the direction of propagation. Single-mode lightguides commonly provide spatial coherence. Some examples of the disclosed technology employ light modes having transverse spatial coherence throughout at least nonlinear interaction regions. Some examples of the disclosed technology provide temporal coherence over a slippage time (e.g. due to chromatic dispersion) over the entire nonlinear interaction regions.

As used herein, "component" refers to a component of light. Light propagating in a medium can include photons or waves with varying properties including frequency (equivalently, wavelength), polarization state, direction of propagation, spatial structure, or temporal structure. A component is any portion of the light in the medium that is distinguishable from or separable from other components based on the varying property.

In disclosed examples, components can have different frequency bands, sometimes labeled as probe, pump, or conjugate components. Generally, a component can retain its identity through amplification, phase shift, transiting optical devices, or some other optical transformations. However, sometimes a parent component can be split into one or more child components distinct from their parent, or two or more distinct components can sometimes be combined into a single component. The term "mode" is sometimes used synonymously with component; however, mode can also refer to e.g. a mode of operation (reflection mode, transmission mode) or as a statistical measure. Two components or modes of light can be spatially distinguished, e.g. a beamsplitter can separate light into a forward propagating mode and a 90° deflected mode. Components can be distinguished by frequency, e.g. co-propagating probe, pump, and conjugate modes in a lightguide can have substantially separate frequency bands and can be distinguished thereby. In other examples, components can be distinguished by other parameters, such as polarization state, direction of propagation, or temporal profile. As used herein, "mode-coupling" refers to any nonlinear optical process in which two different components (modes) of light interact.

In disclosed examples, nonlinear interaction between a pump component and a sideband component can give rise to a light component dubbed a "conjugate" component that is at an image frequency, particularly where the pump frequency is the average of the sideband frequency and the conjugate frequency.

As used herein, a "coupler" or "optocoupler" is an optical device that couples a portion of light from one lightguide to another lightguide. A 50-50 coupler has at least three ports; optical power received at port 1 results in 50% each emerging from ports 2 and 3. A coupler can be a reciprocal device, but this is not a requirement. Some couplers can offer wavelength-insensitive performance over an operating band of wavelengths, but this is not a requirement. Other couplers can offer wavelength-selective performance, such as an add-drop multiplexer (ADM).

As used herein, "feedback" refers to coupling an output of a device in such a way as to influence an input to the same device. As used herein, a "fiber" or "optical fiber" is a flexible lightguide having a longitudinal extent and a narrow generally uniform cross-section with a transparent core through which light can be propagated along the length of the fiber. Some fibers have a glass core. A fiber that can support a single propagating mode (with possibly multiple polarization states) in a given direction along the fiber is dubbed a "single mode fiber" (SMF). Fibers can be manufactured with a wide range of optical properties to make them suitable for particular uses. A fiber type of interest in this disclosure is "highly nonlinear fiber" (HNLF) having a gamma factor ($\gamma$) of at least 5, and often about 9, for example $9\pm1$, measured in $W^{-1}km^{-1}$. HNLF can be germanium-doped silica fibers. For short lengths, parametric amplifier gain can scale as $\gamma PL$, for pump power P and length L. Other fiber types include dispersion-shifted fibers, dispersion compensating fibers, and polarization maintaining fibers. Optical fiber can be fabricated as optical devices in which a functional characteristic is integrated within the optical fiber. A fiber Bragg grating can be such a device, embedding a longitudinal grating within a fiber to provide wavelength-selective transmission or reflection properties.

As used herein, "four-wave mixing" is a nonlinear optical process coupling four photons or, equivalently, four light waves. In examples described herein, three existing photons can interact to give rise to a new fourth photon. In other examples, two existing photons can generate two new photons. Of interest herein is "pump-degenerate" four-wave mixing, in which two similar pump photons, at a pump wavelength, interact with a third probe photon, in a pump sideband, to form a new fourth photon in either the pump wavelength range or a conjugate wavelength range. Four-wave mixing can be phase sensitive, and accordingly four-wave mixing can be used to provide phase sensitive amplification in a nonlinear medium. Commonly, four-wave mixing can rely on third-order nonlinear susceptibility $\chi^{(3)}$ for nonlinear coupling between four photons.

As used herein, a "fringe" is a detection of a phase-sensitive combination of two or more optical signals. A fringe can be spatially discernible, as in a double-slit experiment; alternatively a fringe can be temporally discernible, as when one of the combined optical signals is swept in phase; however, neither of these are required. One or more discernible fringes can form a fringe pattern, having an alternating succession of dark and bright fringe points. Alternatively, a fringe can be implicit, as when a detected optical signal represents a single point of a spatial or temporal fringe pattern.

As used herein, "gain" refers to an amount of amplification of a signal. Where used without qualification, gain of a light signal can be defined as output power divided by input power. For example, probe gain can be the ratio of output power of a probe light component to input power of probe light; both input and output probe power can include seed probe power. Where used without qualification, gain of an electrical signal can be defined as the ratio of output voltage (or current) to input voltage (or current).

As used herein, a "gyroscope" is an instrument for measuring or maintaining orientation or angular velocity. An optical gyroscope can incorporate a fiber sensor having the phase of transmitted light sensitive to angular velocity of the sensor, e.g. by the Sagnac effect.

As used herein, a "hydrophone" is an instrument for measuring acoustic waves or other pressure waves in water or another fluid. An optical hydrophone can incorporate a fiber sensor would on a drum. An incident pressure wave can cause corresponding oscillations in the drum diameter, which can manifest as strain in the fiber and a measurable change in its propagation constant and in the phase of transmitted light.

As used herein, an "interferometer" is an optical apparatus which uses phase relationships between light components to make a measurement. Some interferometers described herein can be classified as SU(1,1) devices, based on having component transformations according to an SU(1,1) Lie group.

As used herein, a "lamp" is a source of light, which can be a transducer from a source form of energy into light energy. The source form of energy can itself be light energy, can be another form of electromagnetic or electrical energy, or can be another form of energy.

As used herein, a "laser" is a lamp that operates by coherent stimulated emission of radiation in a cavity. The light from a laser commonly has a high degree of temporal and spatial coherence. Laser types include solid state lasers, diode lasers, dye lasers, gas lasers, and free electron lasers. Lasers can be configured in many different ways to achieve desirable properties such as wavelength stabilization, pulsed operation (including mode-locked), or wavelength tunability. Although lasers can be convenient lamps with satisfactory coherence properties, the use of lasers is not a requirement. Alternative examples of the disclosed technologies can use lamps with a lower degree of coherence, such as a superluminescent diode (SLD).

As used herein, "light" refers to propagating electromagnetic energy having spectral content between about 30 THz (terahertz) and 3 PHz (petahertz). This frequency range corresponds to free-space wavelengths of about 100 nm to about 10 μm. Frequencies and wavelengths can be used interchangeably in this disclosure. Particularly, light is not limited to the visible portion of the electromagnetic spectrum (about 400 nm to 800 nm). In some embodiments, light between 1200 nm and 1700 nm wavelength can be used, for compatibility with commercially available fiber, light sources, and other devices. Although light described herein can often be guided within media having refractive index n>1, the wavelengths ascribed to such light refer to the free space wavelengths, as is common in the art.

As used herein, a "lightguide" is a structure in which light can propagate with spatial confinement in at least one dimension. Common lightguides described herein have a longitudinal axis along with light can propagate, with substantial confinement in both transverse directions, such lightguides can be termed "axial lightguides." Axial lightguides can commonly be fiber (such as glass fiber) or planar waveguides (commonly silica) formed on a photonic integrated circuit (PIC). Other lightguides such as an arrayed waveguide grating (AWG) can be planar structures supporting spreading in one transverse dimension within the plane, with confinement in another transverse dimension perpendicular to the plane. Some axial lightguides can be fabricated into or coupled with structures supporting purposeful partial loss of confinement in one or both transverse dimensions; optical couplers can be examples. Lightguides can be free of alignment issues, can provide inherently stable geometry, can easily provide spatial overlap of multiple components as required for nonlinear interactions, and can be readily deployed with long path lengths, even in a compact volume.

As used herein, a "linear transformation" is a transformation from an input quantity (x) to an output quantity (y) of the form $y = A \cdot x + B$, where A and B can be constants. The term encompasses piecewise linear transformations, where $A = A1$ and $B = B1$ for a segment $x \in (x1, x2)$ and $A = A2$, $B = B2$ for a segment $x \in (x2, x3)$. Output y need not be continuous at $x = x2$. Linear transformation of phase is of interest herein. Some linear transformations of phase can be piecewise linear transformations, and can have $A1 = A2$ across a segment boundary; B and y jump by $2\pi$ (or equivalently 360°) at the segment boundary.

As used herein, two quantities can be said to "match" if values of each are equal to within a tolerance. Without qualification, the term match can be understood to have a tolerance can be 10% for any magnitude quantity or ratio of such magnitudes, whether measured in linear or logarithmic units (10% in power being about 0.4 dB), or a tolerance of 5° (about 0.1 radian) in phase. Other phase tolerances can be 30°, 20°, 10°, 2°, 1°, 0.5°, 0.2°, or 0.1°. Other magnitude tolerances can be 0.1%, 0.2%, 0.5%, 1%, 2%, 5%, 20%, 50%, or 0.1 dB, 0.2 dB, 0.5 dB, 1 dB, 2 dB, or 3 dB.

As used herein, a "medium" is a material through which light can propagate. The transmissive material of a lightguide can be a medium.

As used herein, a "modulator" is an optical device that couples one or more components of light from an input port to an output port, with a change in optical property applied to at least one of the components. A differential modulator transports two or more components of light from input to output, with a change in optical property applied to one component, with the same change not being applied to a second component. In some examples, the changed optical property can be the phase of a selected light component; the phase of one light component can be differentially modulated with respect to the phase of other components.

As used herein, a "monitoring system" refers to one or more apparatuses that are configured to detect, measure, report, or record one or more environmental or operational parameters.

As used herein, "multiplex" refers to combination of two or more optical components in a single lightguide. Conversely, "demultiplex" refers to separation of two or more optical components from within a lightguide. Often, multiplexing and demultiplexing can occur in the spatial domain, e.g. two modes can be spatially separated, but this is not a requirement. Multiplexing or demultiplexing can occur in another domain, such as a temporal domain, or in more than one domain. A device for demultiplexing is sometimes dubbed a "splitter," while a device for multiplexing is sometimes dubbed a "recombiner" or just "combiner".

As used herein, a "nonlinear" material or device is one whose intended behavior relies on a nonlinear process or nonlinear material property. A linear process or property is one where the magnitude of a response or output is linearly proportional to the magnitude of a stimulus or input. A nonlinear process or property is a process or property which is not linear. To varying extents, many materials or devices have both linear and nonlinear characteristics. In a linear material or device, nonlinear aspects can generally be undesirable, while in a nonlinear material or device, at least one nonlinear aspect can be important for intended performance. The same material or device can be linear or nonlinear depending on its use. A nonlinear material or device can have multiple nonlinear properties, some of which can be responsible for its intended behavior, while others can be undesirable.

As used herein, an "optical add-drop multiplexer" (OADM) is an optical device having at least three ports: an input port, an output port, and one or more side ports. Of multiple wavelengths entering the device at the input port, one or more selected wavelengths can be dropped out a side port, while remaining wavelengths (excluding the dropped wavelengths) exit the device at the output port. Concurrently, one or more auxiliary light components can be added from a side port, also exiting at the output port. Commonly, the dropped wavelengths and the added wavelengths can be the same, but this is not a requirement. Commonly, all dropped wavelengths can be routed out a single side port, but this is not a requirement, and similarly for added wavelengths. Commonly, side ports for dropping and adding can be separate, but this is not a requirement. With an integrated circulator, a single OADM side port can be used to add and drop a given wavelength.

As used herein, an "optical sensor" is an optical device formed of an optical medium in which a property of light in the medium is changed when an external environmental parameter varies. In an "intrinsic" optical sensor, the environmental parameter variation causes a measurable change in an optical property of the medium (for example, refractive index, polarization coupling, opacity, or nonlinear susceptibility) and can be distinguished from an "extrinsic" sensor for which the light is changed outside the optical medium (for example by light scattering). The intrinsic-extrinsic distinction is independent of the distinction between an "internal" sensor that can be integrated within a modulator, and an "external" sensor that can be coupled to one or two ports of a modulator. A "fiber sensor" is an optical sensor having a fiber as the optical medium. Optical sensors can operate in transmission mode, having at least two ports, or can operate in reflection mode, having at least one port.

As used herein, a "path" refers to a track in space, generally a curvilinear, straight, or segmented line, followed by a component of light. Two or more components of light can share a path, in part or in entirety. In a lightguide, a path generally follows an axis of the lightguide.

As used herein a "petrochemical access shaft" refers to a shaft below the earth's surface used for recovering or transporting oil, gas, or another petrochemical fluid. Common petrochemical access shafts can include oil wells, gas wells, or fracking wells.

As used herein, "phase" denotes a position on an oscillatory phenomenon. The oscillatory phenomenon can be a light wave, and the position can be an angular argument of a sinusoidal function describing an oscillatory electric field of the light wave. For example, the electric field of a light wave propagating in the +z direction in a medium can be proportional to $\cos(2\pi ft - 2\pi z/\lambda + \varphi)$, where f is frequency, $\lambda$ is the wavelength in the medium, t is time, z is coordinate position in the z direction, and $\varphi$ is a phase offset. By convention, the phase can be taken as the parenthetical term, and can be expressed in radians, degrees, or another angular measure. At a given coordinate $z=z_0$, phase increases with time. At a given time $t=t_0$, phase decreases in the direction of propagation. At a given space time point $(z_0, t_0)$, phase increases as $\varphi$ increases.

As used herein, a "target phase" is a position of an oscillatory phenomenon at which it can be desired to operate an apparatus or make a measurement. Because phase can be related to fringes, a target phase can be a dark fringe point, a bright fringe point, a midpoint, or an intermediate point having maximum slope. The choice of target phase can depend on a dominant noise mechanism in a given application.

As used herein, "phase-sensitive amplification" refers to a gain process in light having two or more components, in which the amount of gain experienced by one component can be dependent on a relative phase among the light components. The terms phase-sensitive amplification or phase-sensitive gain encompass cases where the gain is less than unity and a component loses energy, sometimes dubbed "deamplification," such as at or near a dark fringe point.

As used herein, "phase shift" refers to a change in a relative phase of a light wave at one spatial point and time relative to a reference point at a fixed time offset. For example, if the phase of a pump component is +30° at an entrance to a phase-sensitive amplifier, relative to the exit window of a pump laser, and then becomes +35° at the amplifier entrance (e.g. responsive to a fiber sensor detecting temperature change), then the pump component has experienced or incorporated a phase shift of 35°−30°=5°.

As used herein, a "phase shifter" is an optical device that imposes a phase shift on one or more light components transiting the device.

As used herein, a "photodetector" is a device that receives a light signal and outputs a measurement of that light signal, or a representation of such a measurement.

As used herein, a "photosensor" is a transducer that converts a light signal into an electrical signal or into some other form of signal. Photodiodes, including avalanche photodiodes, and phototransistors can be examples of photosensors.

As used herein, a "probe" refers to a light component that can participate in a nonlinear mixing process. In some examples, the probe can be amplified by nonlinear amplification including phase-sensitive amplification, can be transformed by a modulator or an optical sensor, or can be detected by a detector such as a phase sensitive detector. The probe component can include both seed light and probe light obtained through nonlinear amplification. A probe can participate in nonlinear amplification within a restricted spatial or temporal extent, but can nonetheless be considered a probe over its entire extent.

As used herein, a "pump" refers to a light component that can participate in a nonlinear amplification process to transfer its own power into another component. A pump can provide nonlinear amplification within a restricted spatial or temporal extent, but can nonetheless be considered a pump over its entire extent.

As used herein, "seed" refers to a light component injected into an optical amplifier, to be amplified therein.

As used herein, "sense" means to convert a physical or chemical parameter into an optical or electrical signal. In some examples, the sensed parameter can be an environmental parameter, and the optical signal can be a phase shift of a light component.

As used herein, a "sensing system" is an apparatus for making a measurement of a sensed parameter.

As used herein, "susceptibility" $\chi$ refers to a tensor property of a material relating vector electric field E and vector polarization P, via $P=\chi E$. Of interest in this disclosure is a third-order nonlinear component of susceptibility which can enable four-wave mixing, via $P_4=\chi^{(3)}E_1E_2E_3$. While $\chi^{(2)}$ materials can also exhibit $\chi^{(3)}$, they can also have dominant nonlinear effects due to $\chi^{(2)}$. Accordingly, in some examples, nonlinear materials whose principal nonlinear susceptibility is $\chi^{(3)}$ can be preferred.

As used herein, "sweep" refers to a continuous modulation of a signal parameter, such as phase.

As used herein, a light component that enters an optical device and leaves the optical device can be said to "transit" the device. The light component can transit the device in reflection mode (emerging from the entrance port), in transmission mode (emerging from a different port), or in a combination of modes.

As used in this disclosure, "visibility" of a fringe is a measure of discernibility between dark and bright fringe positions. Visibility V can be defined by an equation V=(Pmax−Pmin)/(Pmax+Pmin), that is, the ratio of fringe amplitude (in power units) to median power, where Pmax and Pmin represent optical power at the bright and dark fringe points respectively.

First Example Device

FIG. 1 is a block diagram 100 of an example optical device 120 according to disclosed technologies. Several insets in FIG. 1 show properties of optical signals and other parameters to assist with the description of FIG. 1. Optical device 120 includes nonlinear lightguides 130, 170 coupled by a modulator 150. Nonlinear lightguide 130 can generate probe and conjugate sidebands 132, 136 of pump light 124, 134 with a determinate phase relationship. Modulator 150 can introduce a phase shift 155 on one or more received components of light 153A, 153B. Nonlinear lightguide 170 can provide phase-sensitive amplification 175 of second probe and second conjugate light components 172, 176. Thus, the developed power of second probe 172 or second conjugate 176 light components at the output of lightguide 170 can depend on the phase shift 155 introduced at modulator 150, and optical device 120 can be used as a measuring instrument.

Nonlinear lightguide 130 can be coupled to lamps 112, 114 to receive seed probe light 122 and pump light 124 respectively through optocoupler 116. Through a nonlinear process, the pump light 124 and seed probe light 122 can interact to amplify the seed probe light 122 into probe light 132. Conjugate light 136 can also be concurrently generated within the nonlinear lightguide 130. The pump light 124, 134, the probe light 132, and the conjugate light 136 can be spatially and temporally overlapping, and can be regarded as components of mixed light 138 within or at an output of nonlinear lightguide 130.

The probe gain 135 can be defined as a ratio of output power of probe light 132 to input power of seed probe light 122. The probe gain 135 can be dependent on length 131 of nonlinear waveguide 130.

Modulator 150 can receive a given component 153A of the mixed light 138 from nonlinear lightguide 130. With incorporation of a phase shift 155, given component 153B can be forwarded to nonlinear lightguide 170. In varying embodiments, the given component 153A can be a probe light component 132, a conjugate light component 136, or a pump light component 134. In some embodiments, an optical sensor 160 can be coupled to modulator 150 to provide the phase shift 155 representative of a physical or chemical quantity such as pressure, temperature, etc. Other components of mixed light 138 can pass through modulator 150 without experiencing the phase shift 155, so that the determinate phase relationship among the components of mixed light 138 can be changed dependent on a sensed quantity.

Nonlinear lightguide 170 can be coupled to receive at least the phase-shifted given component of light 153B from modulator 150. Nonlinear lightguide 170 can also be coupled to receive other components, either through modulator 150 or from an alternate path. For example, if the given component 153A, 153B is probe light 172, then the other components include pump and conjugate light 174, 176, and similarly if the given component 153A, 153B is pump light 174 or conjugate light 176. Thus, nonlinear lightguide 170 receives mixed light 178 comprising probe light 172, pump light 174, and conjugate light 176, one of which can be the phase-shifted given light component 153B. Through a nonlinear process, pump light 174 can amplify probe light 172 and conjugate light 176, with phase-sensitive gain 175 dependent on phase shift 155. The phase-sensitive gain 175 can be averaged over a range of phase shifts 155 (e.g. 0 to $2\pi$) to obtain averaged phase-sensitive gain 177. Both phase-sensitive gain 175 and averaged phase-sensitive gain 177 can be dependent on length 171 of nonlinear waveguide 170. Due to the phase-sensitive gain 175, the power of one or more components output from amplifier 170 can be dependent on the phase shift 155, and optical device 120 can be used as an interferometer.

As described herein, superior performance can be obtained when one or both of lengths 131, 171 are selected so that the averaged phase-sensitive amplification 177 matches the probe gain 135.

Outputs of nonlinear lightguide 170 can be coupled to a photodetector 180 to detect one or both of amplified probe light 172 or amplified conjugate light 176, and measure the phase shift 155 therefrom. Exemplary measurement techniques are described herein.

Numerous of the blocks depicted in FIG. 1 can be coupled to a computer-implemented measurement and control system (not shown) incorporating one or more computing environments with one or more controllers and one or more data acquisition subsystems.

Many variations are possible, including without limitation those described herein. For example, optical device 120 can be extended to incorporate one or more additional items as shown in FIG. 1 or as described elsewhere herein, without limitation. A seed lamp 112 can provide a determinate probe component, free of vacuum noise fluctuations. However, some examples can omit seed lamp 112, allowing the probe and conjugate to be spontaneously generated.

The average phase-sensitive gain can be calculated over a range of phases, which can vary between examples. In some examples, the average phase-sensitive gain can be calculated over all phases (0 to $2\pi$ radians), while in other examples, the average phase-sensitive gain can be calculated over a narrower range accessible during operation of a system, such as within 30° or within 30° of a target phase point. Particularly, in an example configuration employing feedback control, such as described with reference to FIG. 7, the deviation from a target phase point during normal operation can be quite small, and the average phase-sensitive gain can be an average of a single value, namely the phase-sensitive gain at the target phase point.

In varying examples, a nonlinear lightguide (e.g. lightguide 130 or 170) can be an optical fiber or a waveguide on a photonic integrated circuit (PIC), sometimes dubbed planar lightwave circuit (PLC). A PIC embodiment of device 120 can be a chip scale device. A nonlinear lightguide can be a single-mode (SM) guide supporting a single propagating mode of probe, pump, or conjugate light components. A nonlinear lightguide 130, 170 can have an effective third-order susceptibility $\chi^{(3)}$ and can lack an effective second-order susceptibility $\chi^{(2)}$. A gain process in a nonlinear lightguide can be four-wave mixing, e.g. pump-degenerate four-wave mixing. Both nonlinear lightguides 130, 170 can have matching cross-sectional structure or matching composition. In some examples, nonlinear lightguides 130, 170 can be formed of telecom single-mode fiber for operation in the L band (1565-1610 nm), exploiting a weak $\chi^{(3)}$ nonlinearity over suitable fiber lengths.

The lamp 114 producing pump light 124 can be a pulsed laser, e.g. a mode-locked laser. Controller 115 can be coupled to pulsed laser 114, for example to provide active mode-locking. The lamp 112 producing seed probe light 122 can be a continuous-wave (CW) laser. Controller 113 can be coupled to CW laser 112, for example to provide time-multiplexed wavelengths, or wavelength stabilization.

While components of mixed light 138, 178 can follow a same path within nonlinear waveguides 130, 170, modulator 150 can be implemented with a splitter and a recombiner to separate the spatial paths of various components of mixed light 138. Particularly, the spatial path of a given component 153A can be routed through an optical sensor 160 to develop a phase shift 155 representative of a sensed quantity. As shown in FIG. 1, optical sensor 160 can be an external sensor operating in transmission mode, receiving the given component of light 153A at a first modulator port, transporting the given component, and returning the given component 153B, with phase shift 155 applied, to a second modulator port. Sensor 160 can incorporate a length of optical fiber. In other examples, the external sensor 160 can be a reflection mode sensor, such as a fiber Bragg grating (FBG), or the optical sensor 160 can be co-housed with, or integrated within, the modulator 150.

Example Spectra

FIGS. 2A-2C are graphs showing optical power spectra at different positions within an example optical device according to disclosed technologies. FIGS. 2A-2B are indicative of spectra at the input and output of nonlinear lightguide 130 shown in FIG. 1, while FIG. 2C is indicative of an optical power spectrum at the input of nonlinear lightguide 170.

Beginning with FIG. 2A, graph 210 shows average power recorded by an optical spectrum analyzer (OSA) over a 2 GHz resolution bandwidth, as a function of the frequency of electromagnetic radiation. The seed probe light appears as a narrow spike 212 with amplitude +12 dBm (about 16 mW). For the illustrated example, the seed light was provided by a stabilized CW laser 112 with bandwidth well below 1 GHz. Consequently, the spectral peak 212 would not be significantly changed by a reduction of OSA resolution bandwidth to 1 GHz. The pump light appears as a broader spectral profile 214 having a peak of about −27 dBm. Because the spectral profile 214 can be broad compared to the resolution bandwidth, a reduction of resolution bandwidth by half, would reduce the peak power by about half, to about −30 dBm. For the illustrated example, the pump light was provided by a mode-locked pulsed laser 114 having a duty cycle of about $10^{-4}$. Because the OSA reports average power, the instantaneous pump power during a laser pulse can be about 40 dB higher than shown, i.e. with a peak of about +13 dBm (20 mW) in a 2 GHz resolution bandwidth. Taking into account the bandwidth of the pump radiation, the instantaneous pulsed pump power can be about 10 W in the illustrated example, well above the instantaneous seed probe power.

Turning to FIG. 2B, graph 220 shows evolved optical spectra through four-wave mixing in nonlinear lightguide 130. Pump and seed probe light couple to create probe light, centered at the seed probe frequency, and conjugate light at an image frequency. Relative to FIG. 2A, spectral peak 224 of the pump can be seen to have diminished, as pump power is converted to probe light 223 and conjugate light 226. From the perspective of gain calculation, the seed probe can be regarded as part of the probe light, i.e. probe light can include photons from seed laser 112 (in narrow peak 222) as well as photons formed by four-wave mixing (broader profile 223). Furthermore, as the probe power builds along the nonlinear lightguide 130, four-wave mixing between pump 224 and probe seed 222 can be supplemented by four-wave mixing between pump 224 and probe 223, or by four-wave mixing between pump 224 and conjugate 226. Four-wave mixing processes are described further herein.

In some embodiments, the mixed light inputted to the second nonlinear lightguide 170 can have substantially similar spectrum to that shown in FIG. 2B. Although one of the light components can undergo a phase shift between input and output of the modulator, the power spectra can remain substantially unaffected. In other embodiments, it can be desirable to filter out the seed probe light 222 from the total probe light (222, 223 together). For example, a four-wave mixing process with the seed can add DC (that is, phase-independent) white noise and reduce the fringe contrast; filtering out the seed can improve fringe contrast. In other examples, a phase shift 155 can be developed in a resonant device such as a fiber Bragg grating, and the interaction between a resonant device and a broad smooth probe spectrum 223 can be more predictable without narrowband interaction between a narrow seed probe spectral line 222 and a sharply resonant FBG. In other words, it can be desirable to have a probe spectral width larger than (at least 2×, 3×, or 10× times) the resonance width, stability, or manufacturing tolerance of a resonant device such as an FBG sensor. A notch filter can be incorporated, for example in the modulator 150, to provide narrow-band attenuation of seed probe light 222.

FIG. 2C is a graph 230 showing a probe spectrum with the seed probe selectively notched out. The pump spectrum 234 and the conjugate spectrum 236 can be generally similar to FIG. 2B. However, the probe spectrum 233 shows a notch, with the seed light attenuated by about 50 dB in the illustration.

Example Nonlinear Mixing Processes

FIGS. 3A-3B are diagrams 310, 320 of four-wave mixing processes employed in some embodiments of the disclosed technologies. Diagrams 310, 320 are drawn as energy diagrams relative to a ground state 301, with photons providing transitions to virtual energy states as shown. In FIG. 3A, two pump photons 312, 314 combine to reach a virtual energy 315 (shown as a dashed line). Seed probe (or probe) photon 316 drops the virtual energy to 317, and finally conjugate photon 318 returns the process to ground state 301. Conjugate photon 318 can be a four-wave mixing product of pump photons 312, 314 with probe photon 316. In energy terms, the four-wave mixing process of diagram 310 satisfies: E-conjugate=pump1+E-pump2−E-seed.

The light components participating in diagram 310 can have some spectral width, as indicated by tick marks on the associated photon transitions. The widths of the pumps 312, 314 are represented by three tick marks. The width of the seed probe 316 can be small and is represented by a single tick mark. Finally, the conjugate 318 can be somewhat wider than the pumps 312, 314 owing to lack of energy correlation between the pump photons 312, 314.

Although illustrated with photon 316 as seed probe light, a similar process can occur with photon 316 as non-seed probe light, corresponding to spectral profile 223. In such a process, the spectral width of mixing product 318 can be somewhat greater than for the illustrated case. A similar process can also occur with photon 316 being conjugate light, with mixing product 318 generated in the probe spectral region, i.e. E-probe=E-pump1+E-pump2−E-conjugate. These two processes may not be significant until the instantaneous non-seed probe power has built up to be comparable with instantaneous seed probe power.

In FIG. 3B, a pump photon 322 and a seed probe photon 326 combine to reach a virtual energy 325. A second pump photon 324 drops the virtual energy to 327, and finally a probe photon 323 returns the process to ground state 301. The tick marks on the photons 322, 324, 326, 323 represent spectral widths of the associated light components, similar to FIG. 3A. In energy terms, the four-wave mixing process of diagram 320 satisfies: E-probe=E-pump1+E-seed−E-pump2. As for FIG. 3A, similar processes as illustrated in diagram 320 can occur with seed photon 326 replaced by non-seed probe photon (from spectral profile 223) or a conjugate photon (from spectral profile 226).

Other four-wave mixing processes can occur to a lesser extent, such as non-degenerate mixing of probe, pump, and conjugate light. In examples, the processes shown in FIGS. 3A-3B can be dominant. As probe and conjugate power build up along nonlinear lightguide 130, the similar processes described above can also contribute.

The pump-degenerate four-wave mixing described above can be regarded as a phase-insensitive process. The two pump photons involved can be regarded as phase coherent. The probe (including seed probe) light can be at a different frequency than the pump, resulting in continuous phase slip between pump and probe. In examples, the slip distance over which pump and probe slip by one period can be on the order of microns or millimeters, far shorter than a typical length of nonlinear lightguide 130, which can be meters or kilometers. Nonlinear gain averages out over a slip distance, and builds up over the length of nonlinear lightguide 130, which can be many times the slip distance.

In other examples, two independent pumps can be used for Pump-1⊗Pump-2⊗Probe and similar interactions, i.e. four-wave mixing that is not pump-degenerate.

Example Modulator

Figure 4:
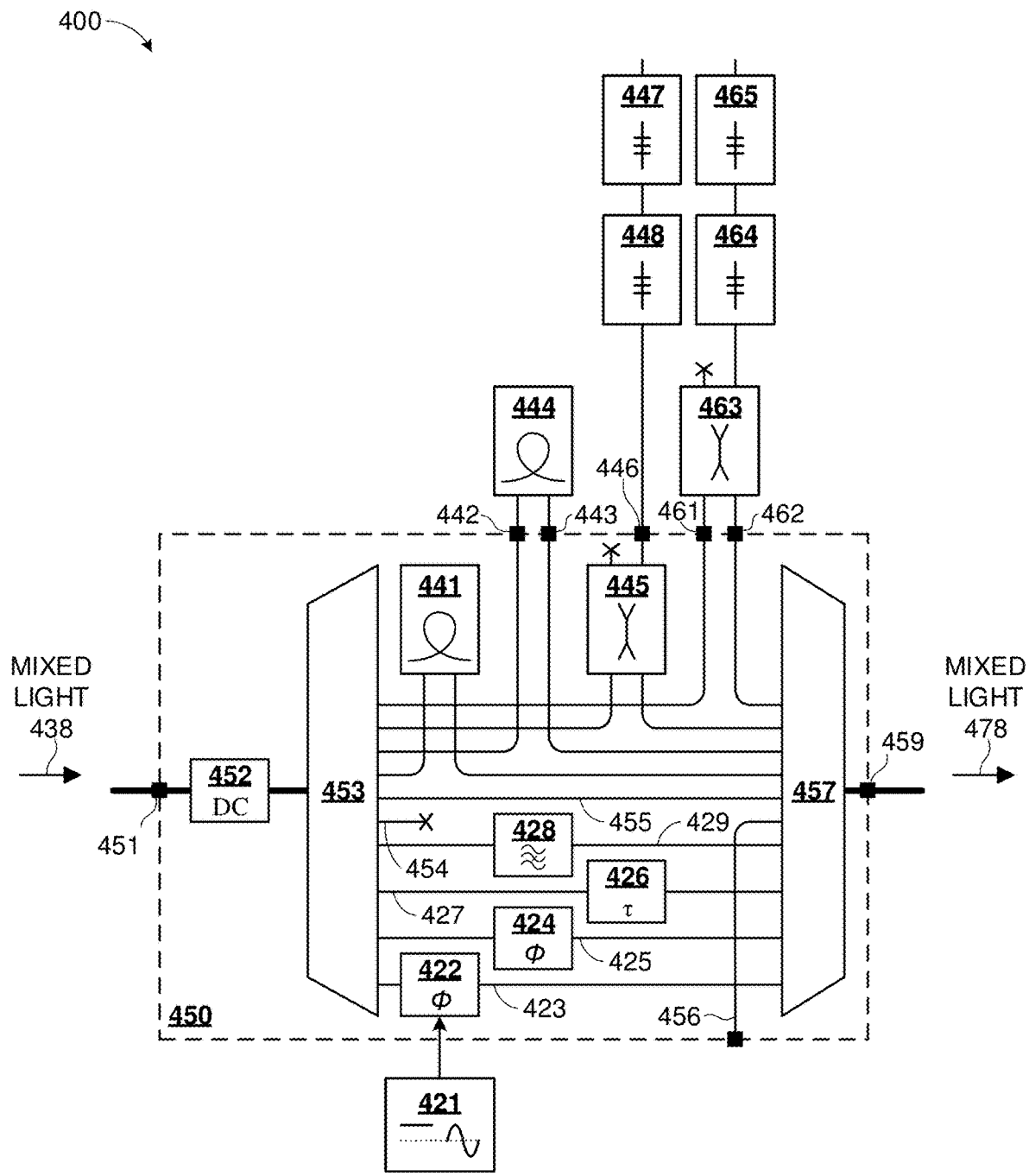
FIG. 4 is a block diagram illustrating example modulator configurations according to the disclosed technologies.

FIG. 4 is a block diagram 400 illustrating configurations of an example modulator 450 according to the disclosed technologies. Modulator 450 can have an input port 451 at which mixed light 438 can be received from a nonlinear lightguide such as 130 and an output port 459 at which mixed light 478 can be coupled to a nonlinear lightguide such as 170. Within modulator 450, any of a variety of optical transformations can be applied selectively to one or more light components. Here, several exemplary transformations are illustrated and described individually for the sake of clarity, however embodiments of the disclosed technologies can freely combine any of these transformations on any components, along with additional optical transformations as are known in the art but not explicitly described herein. Furthermore, for the sake of illustration, modulator 450 is shown with 10 separated internal light paths. However, examples of the disclosed technology can have fewer internal light paths, with one or more of the illustrated transformations variously implemented among these light paths, in any combination.

In order to selectively operate on various light components, modulator 450 can include a splitter 453 to spatially separate the various components of incoming mixed light 438, and recombiner 457 to combine various components into mixed guided light 478. In some examples, splitter 453 can spatially separate all components of mixed light 438 from each other, for example by an arrayed waveguide grating (AWG). Similarly, recombiner 457 can be implemented with an AWG. In other examples, only select components for which optical transformations are implemented can be spatially extracted, separately or together, while other components can flow directly from input 451 to output 459. For such examples, an optical add-drop multiplexer (OADM) can be used to implement splitter 453 and recombiner 457. Path 455 is an example straight through path, which can be wholly contained within a combined implementation of splitter 453 with recombiner 457 such as an OADM, or which can be implemented as a dedicated lightguide between separated devices 453, 457 such as a pair of AWGs.

Transformations of interest for phase sensing instrumentation include phase shifts dependent on a physical or chemical quantity, applied to one or more light components. Intrinsic lightguide sensors can be used, being sensitive to temperature, pressure, angular rotation, electrical current, other physical parameters, or a chemical compound. Such sensors can be implemented in fiber or in a PLC waveguide. Several configurations are shown in FIG. 4. In one configuration, a sensor 441 can be incorporated within modulator 450. In another configuration, sensor ports 442, 443 can be provided for coupling with an external sensor 444. Sensor 444 operates in transmission mode: the sensor 444 receives its light component at sensor port 442 and provides the light component, with variable phase shift incorporated, back to the modulator at sensor port 443. In other examples, it can be desirable to employ reflection mode sensors 447, 448. In such a configuration, a single port 446 can be provided, to which one or more reflection mode sensors can be coupled. A device 445 can be incorporated within modulator 450 so that incident light from splitter 453 and phase-shifted light to recombiner 457 can share the single port 446. The device 445 can be a coupler, such as a 50/50 coupler, or a circulator, such as a Faraday rotator or other non-reciprocal device. In further examples, reflection mode sensors 464, 465 can be coupled to a dual-port modulator interface 461, 462 with an externally connected circulator or coupler 463 as shown.

In addition to incorporating a phase shift from a sensor, a number of other functions can be provided with modulator 450. Optical devices 422, 424, 426, 428 illustrate several optical devices that can be implemented on a separated light path within modulator 450. Controllable phase shifter 422 can be driven by an external controller 421 and can apply a voltage controlled phase shift on path 423. Externally controlled phase shifts are described further herein in the context of phase measurement. In varying examples, the control signal from controller 421 can be a slowly varying signal, for example tracking variations in phase shift introduced by sensor 444, or the control signal can be a continuously varying sweep or oscillatory signal.

Fixed phase shifter 424 can apply a fixed phase shift on path 425. Delay line 426 can provide a group delay on path 427. Filter 428 can provide a notch filter, a bandpass filter, or another filter on path 429. Although devices 422, 424, 426, 428 are illustrated as integrated within modulator 450, this is not a requirement. Any one or more of such devices can be provided external to the modulator 450 and coupled through ports, similar to ports 442, 443 shown for sensor 444. In some instances, a single-port connection can be used as described in connection with port 446.

Dispersion compensation can be provided for individual light components on their respective light paths, as with optical delay line 426. Dispersion compensation or dispersion slope compensation can also be provided on a combined light path by a dispersion compensator 452, which can include a length of dispersion compensating fiber. Dispersion compensation can be provided on an end-to-end basis, and not limited to compensation of dispersion of a preceding lightguide (130). Dispersion compensation, filtering, and other transformations can be used to alleviate effects of undesirable nonlinear processes.

While some examples forward all received components of input light 438 to output light 478, this is not a requirement. A component can be dropped at path 454 and another component can be added at path 456. For example, output from a pump source lamp can be split in two components with a determinate phase relationship, and these can be used to separately pump the two nonlinear lightguides. The "X" symbol on path 454 indicates a terminated optical path. A termination of an optical path can be absorptive, reflective, or mode-converting.

Numerous other variations are possible. For example, some sensor applications can be suitable for differential sensing, where a positive phase shift, say, can be detected on one light component and a negative phase shift can be detected on another light component. The combination of phase shifts can reject common mode phase shifts. Such a configuration can be as shown with sensors 441, 444, with both sensors integrated within modulator 450 as shown for sensor 441, or both sensors externally coupled as shown for sensor 444. The relevant phase in a disclosed phase-sensitive amplifier can be written as $(2 \cdot \varphi_0 - (\varphi_P + \varphi_C))$, where $\varphi_0$, $\varphi_P$, $\varphi_C$ are respectively the sensed phase shifts in pump, probe, and conjugate components. Accordingly, the differential sensing can be accomplished in a variety of ways. As a first example, the positive phase shift can be applied to both probe and conjugate components, and the negative phase shift can be applied to the pump component. As a second example, the positive phase shift can be applied to the pump component, and the negative phase shift can be applied to the conjugate (or the probe) component with twice the sensitivity (e.g. twice the sensing length). For some examples, positive and negative phase shifts can be applied to the pump and conjugate respectively, with e.g. the conjugate sensitivity having reversed sign because of being wound in an opposite sense. Gyroscope, hydrophone, and numerous other measurement applications can benefit from differential sensing.

Example Phase Scan

Figure 5:
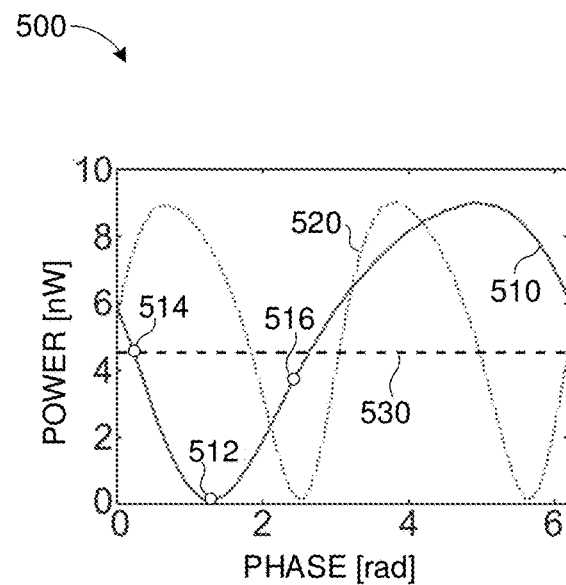
FIG. 5 is a graph illustrating output power of a detected light component as a function of phase shift.

FIG. 5 is a graph 500 illustrating output power of a detected light component as a function of phase shift. Solid trace 510 depicts measured power (in nW) of the probe component as a function of phase shift (in radians) applied to the probe component. With reference to FIG. 1, the output power can be measured at a photodetector such as 180, and the phase shift can be applied by an optical sensor such as 160. Varying power can be a result of phase-sensitive gain in nonlinear amplifier 170. As expected for this configuration, the phase-sensitive gain sweeps through one full oscillatory cycle as the probe phase is scanned by $2\pi$ (approx. 6.28) radians.

Dotted line trace 520 depicts measured power (in nW) of the probe component as a function of phase shift (in radians) applied to the pump component. Otherwise, the experimental configuration is similar to that for trace 510. In this configuration, the phase-sensitive gain sweeps through two full oscillations as the pump phase is scanned by $2\pi$ radians.

Phase-sensitive gain can be understood by considering, in a simplified model, electric fields of a pump wave $E_0 = A_0 \cdot \cos(\omega_0 t + \varphi_0)$, a probe wave $E_- = A_1 \cdot \cos((\omega_0 - \omega_r)t + \varphi_1)$, and a conjugate wave $E_+ = A_1 \cdot \cos((\omega_0 + \omega_r)t)$. Here, E represents electric field, A is amplitude of the electric field, t is time, $\omega_0$ is the pump frequency, $\omega_1$ is the offset between pump and probe or conjugate sidebands. In this model, probe and conjugate waves can be assumed to have the same amplitude $A_1$, and the conjugate phase can be set to 0 without loss of generality. Summing the probe and conjugate waves, $E_+ + E_- = 2A_1 \cdot \cos(\omega_0 t + \varphi_1/2) \cdot \cos(\omega_1 t - \varphi_1/2)$. The first cosine term represents a wave at the same frequency as the pump, and the second cosine term represents a slowly varying envelope at the sideband offset frequency $\omega_1$. The nonlinear gain interaction between pump and sidebands depends on the relative phase between pump (phase: $\varphi_0$) and the combined sidebands (phase: $\varphi_1/2$). The phase-sensitive gain can be twice as sensitive to change in pump phase compared to change in probe phase, as illustrated in FIG. 5. A phase-sensitive gain process can generally conform to the diagram of FIG. 3A.

Because the output power is sensitive to applied phase shift (e.g. 155), the measured output power can be used to determine the applied phase shift. Some detection schemes are described herein. In some examples, a phase detector can be configured to determine or track a specific operating point. Possible operating points 512, 514, 516 are marked on probe scan trace 510.

In some examples, best phase sensitivity can be obtained at the dark fringe point 512, which can be due to rapid noise fall-off at the dark fringe point, a property of the nonlinear gain process in lightguide 170. In other examples, a different operating point can be used. Operating points 514, 516 have steep gradient of power as a function of scanned phase, and can be chosen as target operating points in such examples.

Also shown in FIG. 5 is the output power midway between minimum and maximum, represented by dashed line 530. The traces 510, 520 can exhibit some distortion relative to a harmonic-free sinusoidal waveform, which can be due to competing nonlinear effects having different phase dependence than the phase sensitive gain described herein.

First Example Detector

Figure 6:
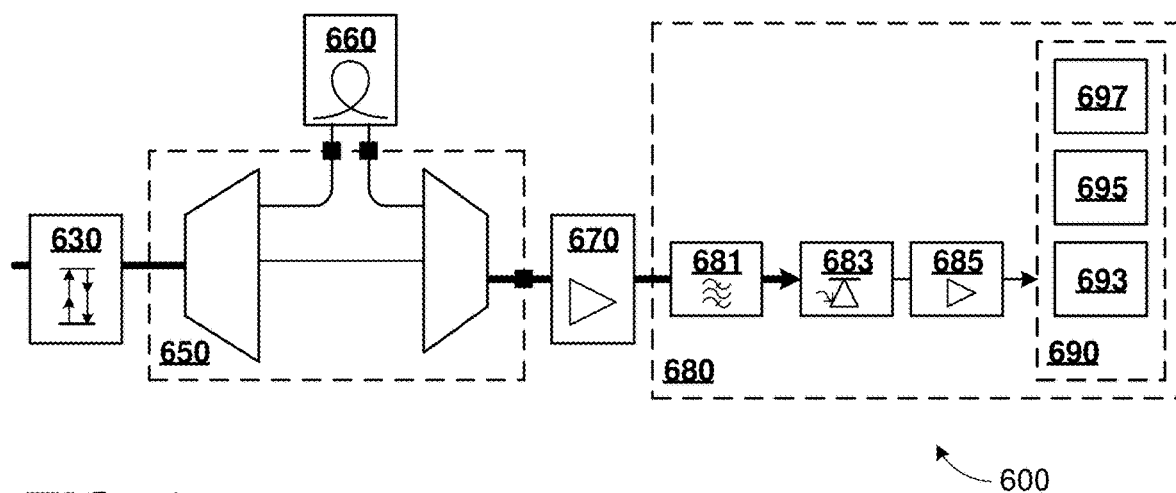
FIG. 6 is a block diagram illustrating a first technique of detecting a phase shift according to the disclosed technologies.

FIG. 6 is a block diagram 600 illustrating a first technique of detecting a phase shift according to the disclosed technologies. Nonlinear lightguides 630, 670 can be coupled by modulator 650. Similar to nonlinear lightguide 630, lightguide 630 can be configured to generate probe and conjugate light components, e.g. by four-wave pump-degenerate mixing. Modulator 650 diverts the probe component to optical sensor 660 where a phase shift, representative of a sensed quantity, can be applied to the probe component. Similar to nonlinear lightguide 170, lightguide 670 can be configured for phase-sensitive amplification of probe and conjugate light components.

For the illustrated system, detector 680 can provide optical power measurement of the probe component, and determination of the phase shift applied by sensor 660 and an associated sensed variable.

Bandpass filter 681 can transmit the probe component outputted from lightguide 670, and can block pump and conjugate components. In alternate examples, a bandstop filter 681 can be used to drop the pump component and pass both probe and conjugate components. The transmitted component can be measured by photosensor 683, which can be a photodiode (PD), avalanche photodiode (APD), or phototransistor. The resulting electrical signal can be amplified by amplifier 685 and then input to a computing system 690. Computing system can include a data acquisition subsystem 693, a computer processor 695, and a look-up table 697 which can store a table of sample values representing all or part of an calibrated interferometric response curve such as 510. The output of amplifier, representing measured power, can be digitized by data acquisition subsystem 693 and provided to computer 695, where table look-up can be performed on table 697 to determine the sensed phase. In examples, the sensed phase can be further transformed by computer 695 to determine a value of the underlying sensed parameter (e.g. temperature or another environmental parameter).

Second Example Detector

Figure 7:
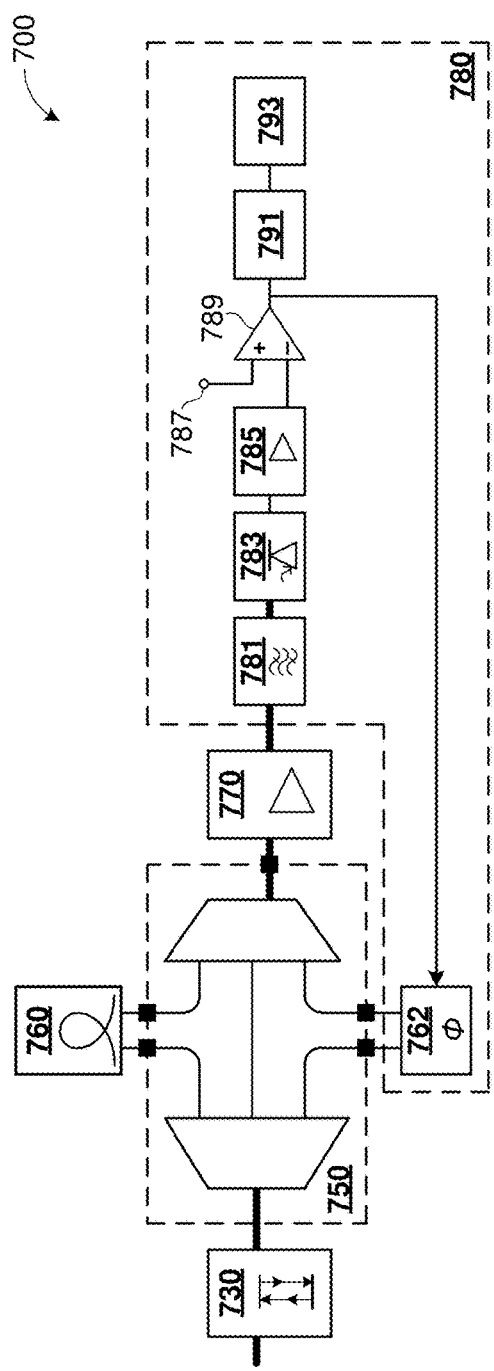
FIG. 7 is a block diagram illustrating a second technique of detecting a phase shift according to the disclosed technologies.

FIG. 7 is a block diagram 700 illustrating a first technique of detecting a phase shift according to the disclosed technologies. Nonlinear lightguides 730, 770 can be coupled by modulator 750. Similar to nonlinear lightguide 130, lightguide 730 can be configured to generate probe and conjugate light components, e.g. by four-wave pump-degenerate mixing. Modulator 750 diverts the probe component to optical sensor 760 where a phase shift, representative of a sensed quantity, can be applied to the probe component. Similar to nonlinear lightguide 170, lightguide 770 can be configured for phase-sensitive amplification of probe and conjugate light components.

For the illustrated system, detector 780 can provide optical power measurement of the probe component, feedback control to a target operating point, and determination of the phase shift applied by sensor 760 and the associated sensed quantity.

Bandpass filter 781 can transmit the probe component outputted from lightguide 770, and can block pump and conjugate components. In alternate examples, a bandstop filter 781 can be used to drop the pump component and pass both probe and conjugate components. The transmitted component can be measured by photosensor or electro-optical (O/E) converter 783, which can be a photodiode (PD), avalanche photodiode (APD), or phototransistor. The resulting electrical signal can be amplified by amplifier 785 and then sensed at differential amplifier 789. In the illustrated configuration, a target operating point can be defined by a voltage 787 provided to the positive input of differential amplifier 789. The output of differential amplifier 789 can be fed back to control an auxiliary phase shifter 762 on a second light component. Auxiliary phase shifter 762 can be a voltage controlled phase shifter.

The feedback operates to adjust the auxiliary phase shifter 762 until the optical power detected at PD 783 matches the power at the target operating point (e.g. 512, 514, 516). Then, the output voltage of the feedback amplifier 789 can be a measure of the auxiliary phase on phase shifter 762 required to compensate for the phase shift (e.g. 155) of sensor 760. This output voltage can be converted to the phase shift by circuit 791. For example, a sensor phase shift of +10° in the probe component can be compensated by an auxiliary phase shift of −10° in the conjugate component, an auxiliary phase shift of +5° in the pump component, or an auxiliary phase shift of −10° in the probe component. With regard to the last, in some examples, the auxiliary phase shift can be applied to the same component as the sensed phase shift. In such examples, the probe component provided to the lightguide 770 can incorporate two phase shifts, both the sensed phase shift representing a sensed quantity, from 760, and a compensating phase shift similar to that described for 762. The transfer function to map auxiliary phase shift to sensed phase shift can be a linear transfer function, which includes piecewise linear transfer functions arranged to accommodate discontinuities where either the auxiliary phase shift or the sensed phase shift wraps around, e.g. at 0=2π radians.

Finally, circuit 793 can be configured to convert the sensed phase shift to a measurement of the underlying sensed quantity, via a known transfer function of sensor 760. The measured physical quantity (or chemical compound) obtained at circuit 793 can be output to a computer display, output to an analog or digital meter, stored in a computer file, or transmitted over a network to a client device.

Circuits 791, 793 can be implemented as analog or digital circuits in any combination. For example, an analog operational amplifier circuit can provide the linear transfer function of circuit 791 to convert from auxiliary phase shift to sensed phase shift. In another example, an analog-to-digital converter (ADC) and a microprocessor can be configured to provide digitization of the sensed phase and inversion of the transfer function of sensor 760, in the digital domain, for circuit 793. Other alternatives can also be used. Varying implementations of other detector blocks 781-789 can also be used. For example, the feedback amplifier 789 can be implemented in the digital domain, or a digitally controlled auxiliary phase shifter 762 can be used.

Furthermore, any combination of detector blocks 781-793 can be integrated on one or more semiconductor or photonic integrated circuits, or can be packaged together. All or part of detector 780 can similarly be integrated with the lightguides 730, 770 or other units shown in FIG. 7.

Third Example Detector

Figure 8:
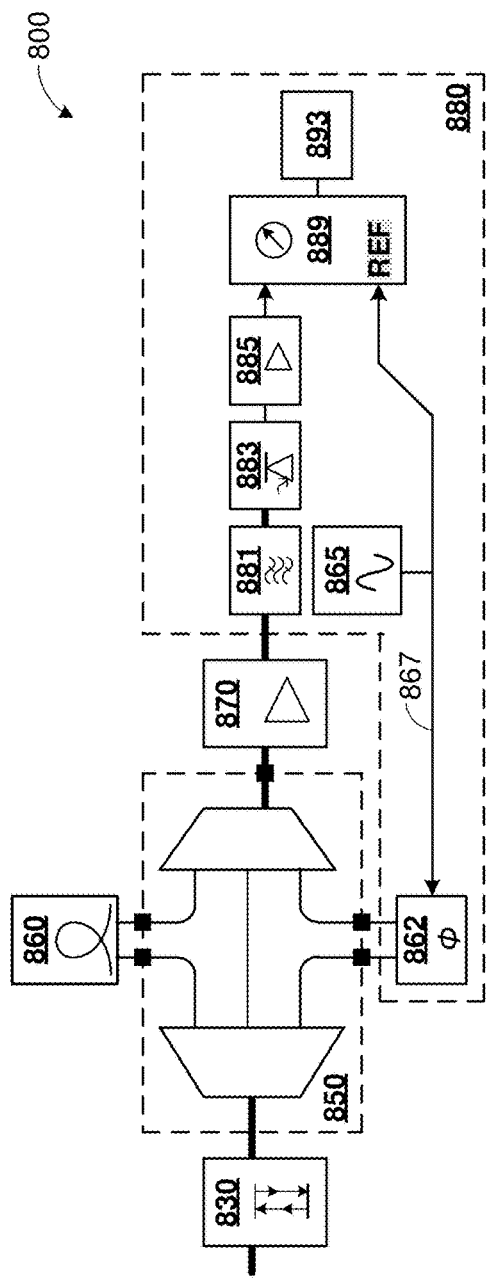
FIG. 8 is a block diagram illustrating a third technique of detecting a phase shift according to the disclosed technologies.

FIG. 8 is a block diagram 800 illustrating a second technique of detecting a phase shift according to the disclosed technologies. Lightguide 830, 870, modulator 850, and optical sensor 860 can be generally similar to those described in context of FIG. 1 or FIG. 7. Auxiliary phase shifter 862 can be functionally similar to phase shifter 762, however phase shifter 862 can be integrated within modulator 850 as illustrated. Within detector 880, filter 881, PD 883, and amplifier 885 can be similar to corresponding units in detector 780. Accordingly, the output of amplifier 885 reflects the phase-sensitive gain in nonlinear lightguide 870, dependent on the sensed phase shift of sensor 860 and the auxiliary phase shift of phase shifter 862.

In detector 880, a free-running oscillator 865 can be used to continuously sweep the auxiliary phase of shifter 862. In varying examples, the output 867 of oscillator 865 can be a sawtooth wave (for linear sweep of the auxiliary phase), a sinusoidal wave, or a triangle wave. Thus, the output of amplifier 885 can generally follow the periodic oscillation of oscillator 865, with an additional phase shift representative of the sensed phase shift of sensor 860.

Phase sensitive detector 889, which can be a lock-in amplifier, can use signal 867 as a reference input, and can measure the sensed phase shift directly. Similar to circuit 793, circuit 893 can convert the sensed phase shift to a measurement of the underlying physical or chemical quantity. As for detector 780, numerous variations are possible. Although FIGS. 7-8 have been described with the sensed phase incorporated into a probe component, this is not a requirement. In varying examples, the sensed phase can be alternatively be applied to conjugate or pump components, as described herein.

Example with Wavelength Multiplexing

Figure 9:
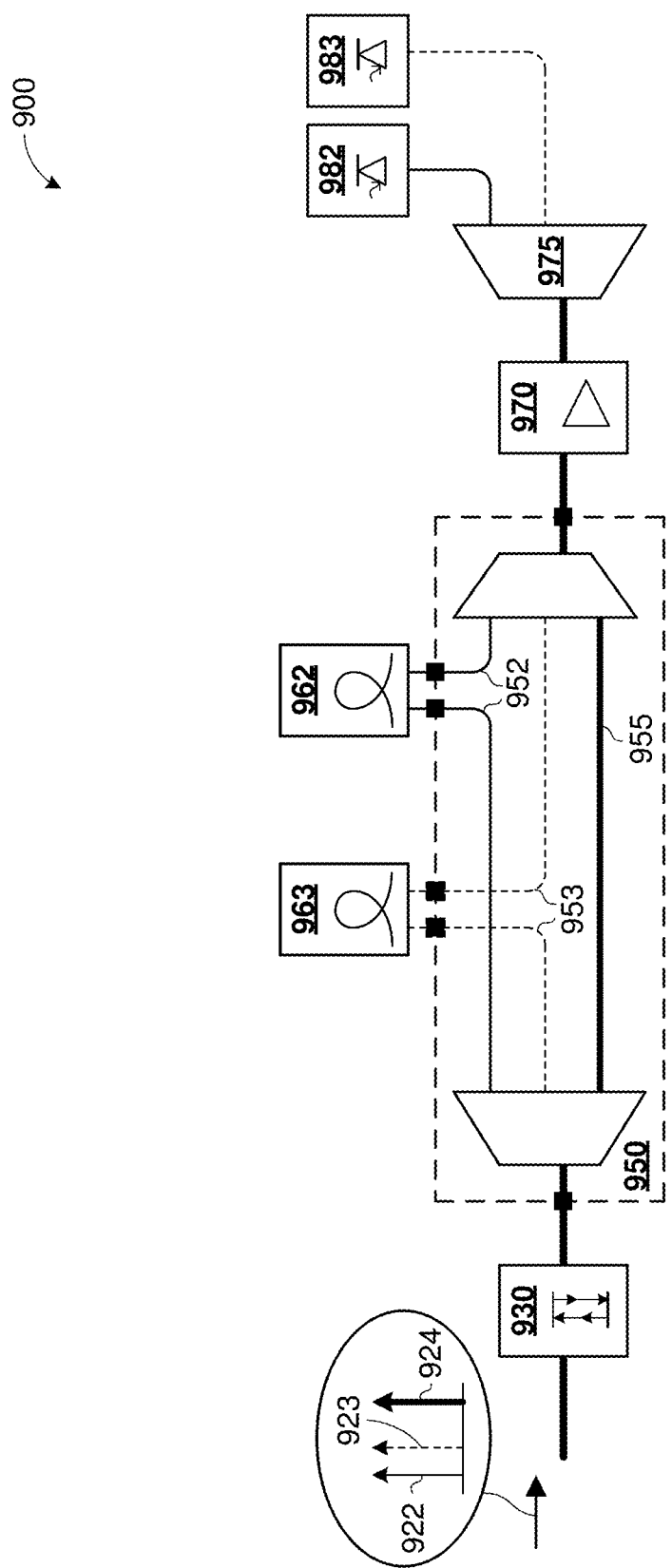
FIG. 9 is a block diagram illustrating a multiplexed device according to the disclosed technologies.

FIG. 9 is a block diagram 900 illustrating a multiplexed device according to the disclosed technologies. Nonlinear lightguides 930, 970 can be similar to those described in context of FIG. 1, and can be coupled by modulator 950. A pump lamp provides a fixed wavelength pump input 924 to lightguide 930. Seed probe light can be multiplexed between light components 922, 923 at respective wavelengths. The inset in FIG. 9 indicates the spectral positions of the light components 922-924 as a function of frequency. The multiplexed seed light 922/923 can be provided by a single laser with wavelength control, or can be provided with independent sources for the two wavelengths, with seed components 922/923 multiplexed using an optical shutter, switch, or other coupling arrangement. Lamps and multiplexing components are not shown in FIG. 9.

Within modulator 950, probe light components obtained from seed light 922, 923 follow respective paths 952, 953, and correspondingly incorporate sensed phase shifts from respective optical sensors 962, 963. Pump and conjugate components follow path 955, which in varying examples can be a single path or a plurality of optical paths for respective components.

Following phase-sensitive gain in lightguide 970, the amplified probe components can be separated by splitter 975, and detected by detectors 982, 983. Each detector 982, 983 can employ one of the detection techniques described herein, or another detection technique. In some examples, both detectors 982, 983 can share a single auxiliary phase shifter, similar to shifter 862 of FIG. 8, on the pump component. The details of detectors 982, 983 and auxiliary phase shifters are not shown in FIG. 9.

For simplicity of illustration, FIG. 9 has been described in terms of a multiplexed probe light component throughout. However, this is not a requirement, as the conjugate component mimics the multiplexed behavior of the seed probe source and also experiences phase-sensitive amplification in lightguide 970. Thus, one or both of detectors 982, 983 can alternatively or additionally detect conjugate light, in any combination. Independent of the detected light components, the sensed phase shift can alternatively be incorporated in a conjugate light component. That is, one or both of separated light paths 952, 953 can be a path of a corresponding conjugate light component. In any of these configurations, the component in which a sensed phase shift is incorporated can be multiplexed between respective sensors 962, 963 as the seed probe light is multiplexed. Accordingly, the sensed quantity can be multiplexed between respective quantities detected by the sensors 962, 963.

Furthermore, the illustration of FIG. 9 can be extended to more than two seed probe wavelengths (922, 923, . . . ) and more than two separated optical paths (952, 953, . . . ) on which respective sensors (962, 963, . . . ) can be deployed. Multiplexing can be performed by alternate techniques, singly or in combination. For example, optical switches or shutters can be configured to selectively direct the light path of a single light component among a plurality of sensors.

Example Method

Figure 10:
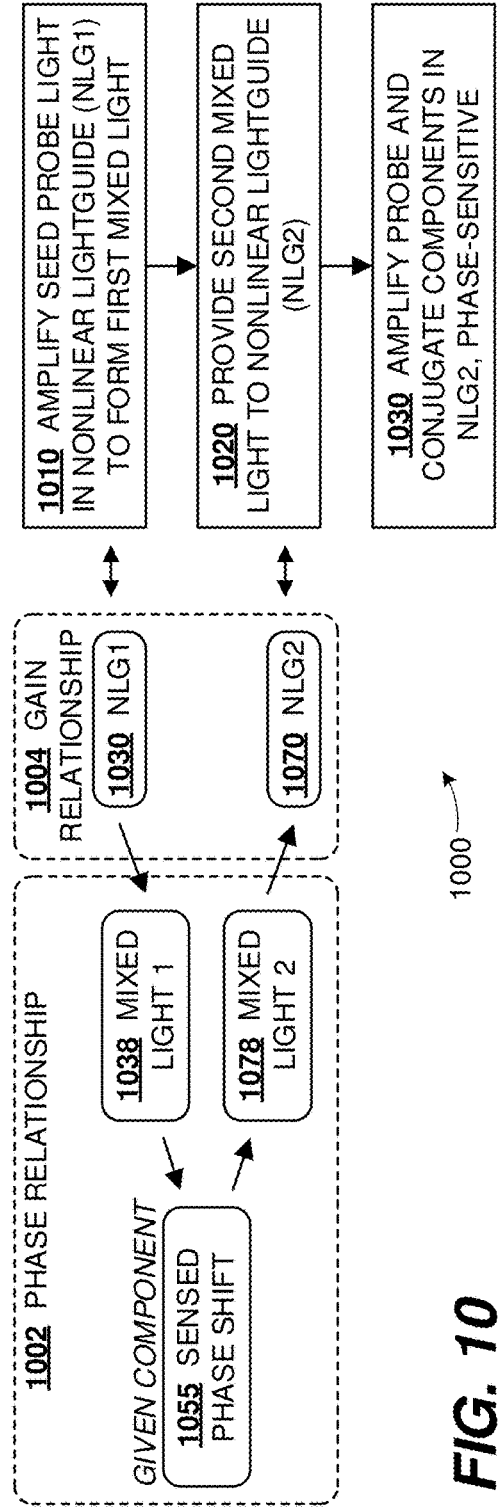
FIG. 10 is a hybrid diagram including a flowchart illustrating an example method according to the disclosed technologies.

FIG. 10 is a hybrid diagram 1000 including a flowchart illustrating a method according to the disclosed technologies. The method is described with reference to the apparatus of FIG. 1 for convenience of illustration, however the method is not limited to such apparatus.

At process block 1010, seed probe light can be amplified by a first gain in a first nonlinear lightguide NLG1 1030 (similar to 130), to form first mixed light 1038 including first probe light, first pump light, and first conjugate light components. In examples, the gain can be obtained through a nonlinear process such as pump-degenerate four-wave mixing (e.g. FIG. 3). At process block 1020, second mixed light 1078 can be provided to a second nonlinear lightguide NLG2 1070 (or 170), the second mixed light 1078 including second probe, second pump, and second conjugate light components. The components of the second mixed light can have phase relationships 1002 with the respective components of the first mixed light. The phase relationship for one of the components can include a phase shift 1055 representative of a sensed quantity. At process block 1030, the second probe and second conjugate components can be amplified in the second nonlinear lightguide 1070. The amplification can be phase-sensitive, and the gain experienced by second probe or second conjugate components can be dependent on phase relationships between probe, conjugate, and pump components as described herein. The gains in nonlinear lightguides 1030, 1070 can have a predetermined relationship 1004. For example, the lengths of the first and second lightguides 1030, 1070 can be selected so that an average of the phase-sensitive gain in the second lightguide 1070 matches gain experienced by the probe component in the first lightguide 1030, for pump and seed power levels introduced into the lightguides 1030, 1070, and other optical parameters. In other embodiments, the gains in nonlinear lightguides can have a different relationship, e.g. 2:1 or 1:2 or another relationship, according to specific operating conditions or dominant confounding nonlinear effects.

Figure 11:
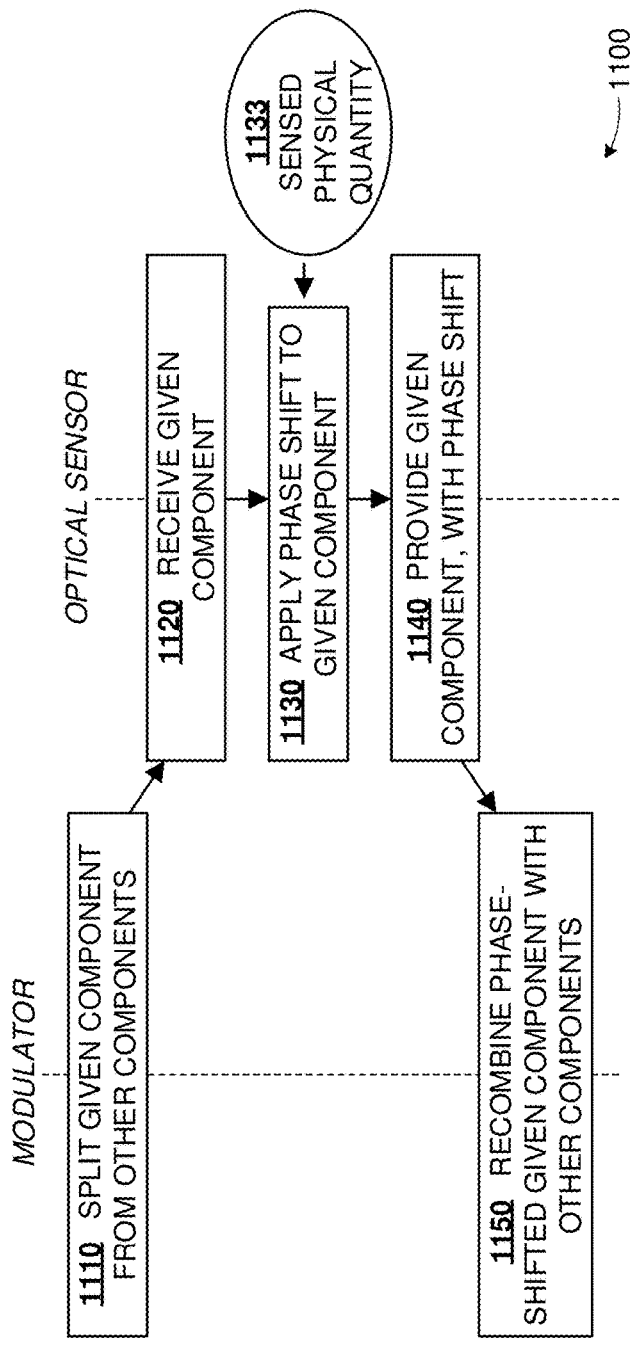
FIG. 11 is a flowchart illustrating additional features of some example methods according to the disclosed technologies.

In some examples, one or more components of the second mixed light can be coupled from the first nonlinear lightguide 1030, 130 to the second nonlinear lightguide 1070, 170 through a modulator (e.g. 150). The phase shift 1055 can be provided by an intrinsic fiber sensor (e.g. 150). FIG. 11 is a flowchart 1100 illustrating additional actions that can be performed using a modulator (150) or an optical sensor (160). At process block 1110, a given component can be split from other components of the first mixed light. At process block 1120, the split given component can be received by an optical sensor (160), and at process block 1130, responsive to the sensed physical or chemical quantity 1133, a sensed phase shift (e.g. 1055, 155) can be applied to the given component. At process block 1140, the given component can be provided (e.g. to modulator 150) for recombination. Then, at process block 1150, the given component, incorporating a phase shift representative of a sensed quantity 1133, can be recombined with the other components.

First Example Detection Method

In a first example detection method, a response curve such as 510 or 520 of FIG. 5 can be used directly to determine phase shift. By measuring power and using a lookup table corresponding to a portion of response curve 510, the measured power can be directly transformed into an estimate of the sensed phase shift. Interpolation on the lookup table can be used. Optionally, a sensing system can be tuned such that a baseline point having a known value of a sensed quantity (or a predetermined value of sensed phase) corresponds to a target phase point on response curve 510.

Second Example Detection Method

Figure 12:
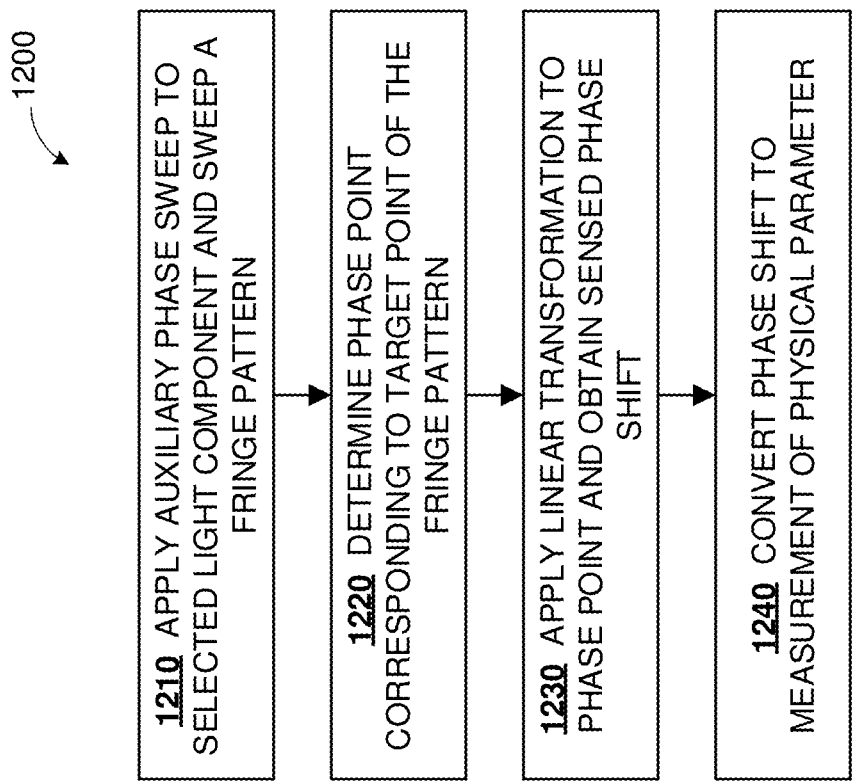
FIG. 12 is a flowchart illustrating an example detection method according to the disclosed technologies.

FIG. 12 is a flowchart 1200 illustrating a second example detection method according to the disclosed technologies. The method is described with reference to the apparatus of FIG. 8 for convenience of illustration, however the method is not limited to such apparatus. At process block 1210, an auxiliary phase sweep can be applied to a selected light component to sweep a fringe pattern at a detector. At process block 1220, a phase point of the phase sweep can be determined which corresponds to a target point of the fringe pattern. At process block 1230, a linear transformation can be applied to the determined phase point to determine the sensed phase shift (e.g. 1055) that was applied to a given component prior to injection into the phase-sensitive amplifier (e.g. 170). At process block 1240, the sensed phase shift can be transformed into a measurement of the underlying sensed physical or chemical parameter. In examples, the target point of the fringe pattern can be a dark fringe point (e.g. 512).

Third Example Detection Method

Figure 13:
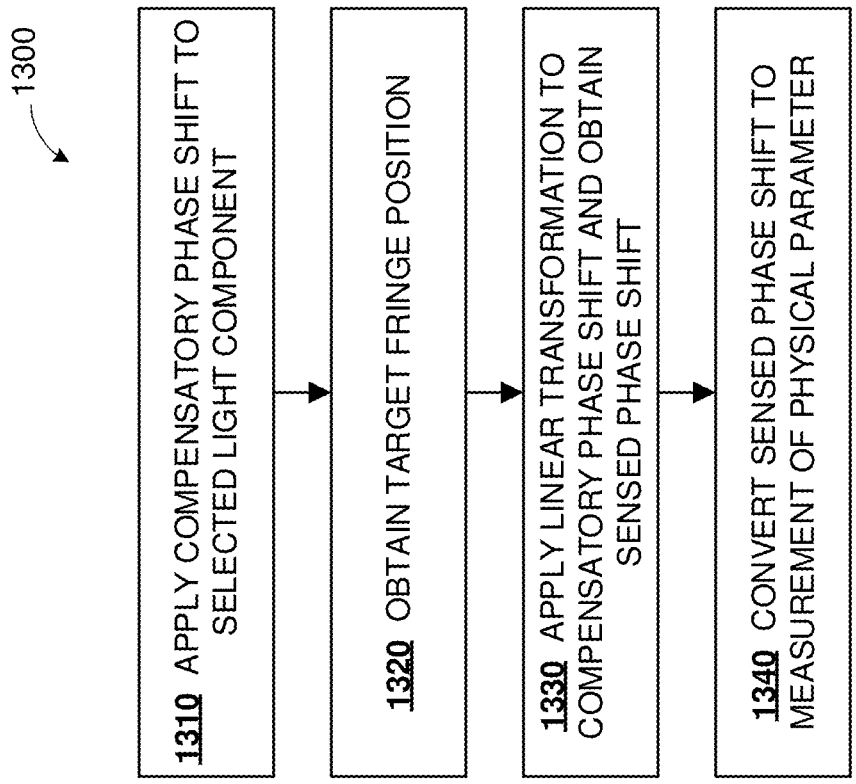
FIG. 13 is a flowchart illustrating another example detection method according to the disclosed technologies.

FIG. 13 is a flowchart 1300 illustrating another example detection method according to the disclosed technologies. The method is described with reference to the apparatus of FIG. 7 for convenience of illustration, however the method is not limited to such apparatus. At process block 1310, a compensatory phase shift can be applied to a selected light component based on feedback from an output of a photosensor (e.g. 783), to obtain, at process block 1320, a target fringe position at the photosensor (783). At process block 1330, a linear transformation can be applied to the compensatory phase shift to determine the sensed phase shift (e.g. 1055) that was applied to a given component prior to injection into the phase-sensitive amplifier (e.g. 170). At process block 1340, the sensed phase shift can be transformed into a measurement of the underlying sensed physical or chemical parameter. In varying examples, the target fringe position can be a dark fringe point (e.g. 512) or a fringe position having steep response to a change of sensed phase (e.g. 514, 516).

Additional Method Variation Examples

Numerous further variations of the above methods are possible. With reference to FIG. 10, seed probe light and pump light can be provided to the first nonlinear lightguide by respective lasers. The seed probe light can be multiplexed between two or more wavelengths, and corresponding sensed phase shifts can be incorporated into different wavelength light components on a time-multiplexed basis. Thus, each multiplexed wavelength can be used to measure a respective physical or chemical property.

Example Optical Sensor

Turning back to FIG. 1, a combination of optical device 120 and detector 180 can form an optical sensor. Detector 180 can be configured according to a technique described herein, or according to another technique, to determine a representation of a sensed quantity from a sensed phase shift (e.g. 155). Optionally, the optical sensor can be integrated with a sensor (e.g. 160) or probe and pump source lamps (e.g. 112, 114). A PIC embodiment of an optical sensor can be a chip scale device.

In a first example, the phase sensing device of the optical sensor can be coupled to a diaphragm or drum to sense a pressure wave. Such a sensor can be used as a hydrophone or as an accelerometer.

In a second example, the phase sensing device can be a fiber coil, configured to develop a phase shift dependent on an angular velocity of the coil around the coil axis. In further examples, two fiber coils wound in opposite sense can be used for probe and conjugate components respectively, to improve phase sensitivity. The two fiber coils can have matched length (and matched delay) and can be implemented with standard single-mode fiber. Such angular velocity sensors can be used as gyroscopes.

Example System

Figure 14:
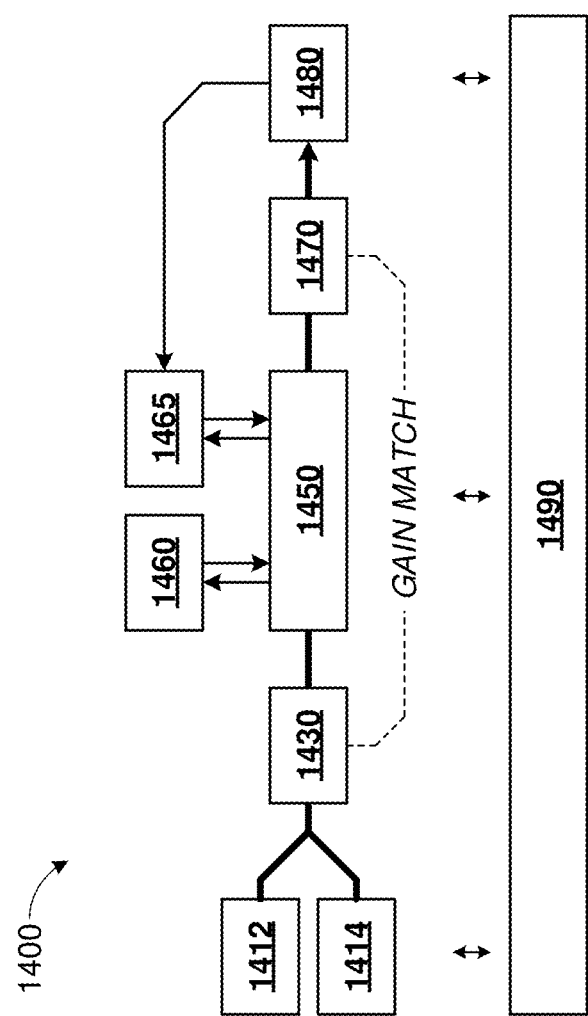
FIG. 14 is a block diagram of an optical sensing system according to the disclosed technologies.

FIG. 14 is a block diagram of an optical sensing system 1400 according to the disclosed technologies. The sensing system 1400 incorporates lasers 1412, 1414 respectively providing seed probe light and pump light to nonlinear lightguide 1430, which can be configured to generate mixed light comprising probe, pump, and conjugate light components, for example by a nonlinear mixing process. At least a given component of the mixed light can be received by modulator 1450 and transported through an optical sensor 1460 to incorporate a phase shift representative of a sensed quantity. With phase shift incorporated, the given component can be coupled to nonlinear lightguide 1470, which can be situated to receive mixed light having probe, pump, and conjugate components. These light components include the given light component received from the modulator 1470, with sensed phase shift incorporated. Nonlinear lightguide 1470 can be configured to provide phase-sensitive gain to probe and conjugate components. The system 1400 can be configured so that the phase-sensitive gain, averaged over phase shift, can match the probe gain of nonlinear lightguide 1430 (output probe power divided by input seed probe power). Gain matching can be accomplished by selection of lengths of lightguides 1430, 1470, by selection of pump power in lightguides 1430, 1470, by polarization shifting, or by any combination of these or other techniques.

Sensing system 1400 further includes a photodetector 1480 coupled to receive and detect at least one of probe or conjugate light components from lightguide 1470. Detector 1480 can also be coupled to a controlled phase shifter 1465 in the path of one of the light components between the lightguides 1430, 1470. In varying examples, sensor 1460 and phase shifter 1465 can be on the light path of a single component, or on light paths of different components. Controlled phase shifter 1465 can be used for a phase detection technique as described herein.

One or more of the blocks described can be connected to computer-based measurement and control system 1490, which can include one or more computing environments, one or more controllers, and one or more data acquisition subsystems. In addition to measurement and control during normal operation, measurement and control system 1490 can also be used to tune or configure the sensing system 1400, for example to set pump power level or seed frequency, to verify power levels, gains, or spectra at any points of the system, or to calibrate a detector.

In some examples, seed probe laser 1412 can be a CW laser. Pump laser 1414 can be a pulsed laser. Numerous variations and configurations of the blocks of system 1400 are possible, as described for similar blocks of other examples herein.

Example Airborne System

Figure 15:
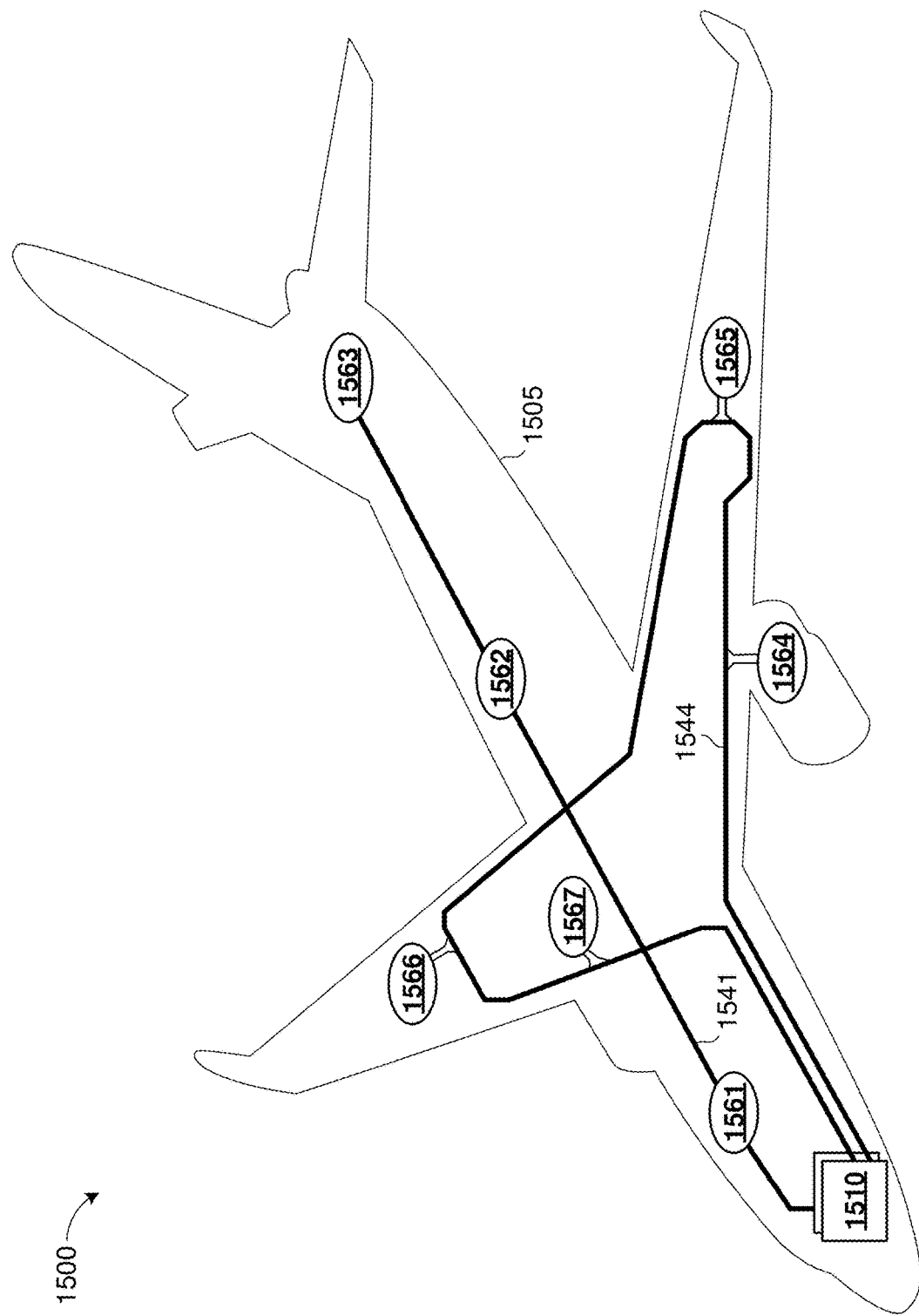
FIG. 15 is a diagram of an airborne optical sensing system according to the disclosed technologies.

FIG. 15 is a diagram 1500 of an airborne optical sensing system according to the disclosed technologies. One or more interferometers 1510 can be housed in an aircraft 1505 and coupled to one or more optical sensors 1561-1567 distributed around the aircraft 1505. An interferometer 1510 can incorporate nonlinear lightguides and other blocks as describe in context of FIG. 14 or elsewhere herein. Fiber bundles 1541, 1544 can route light components among the optical sensors 1561-1567, which can be fiber sensors.

The constituent fibers of bundles 1541, 1544 can be coupled to different respective interferometers 1510, or two or more fibers can share an interferometer 1510, with multiplexing as described herein. The sensors 1561-1567 can be on respective light paths of different components, or two or more sensors can be on a common light path and can be selectively enabled by an external control. Sensors 1561-1563 are illustrated as reflection mode sensors, while sensors 1564-1567 are illustrated as transmission mode sensors.

Sensors 1561-1567 can have intrinsic sensitivity to one or more parameters and can provide a phase shift on a component of light transiting in and out of the sensor. The phase shift can vary in response to variations in a sensed parameter as described herein. An interferometer 1510 coupled to a sensor 1561-1567 can detect such a phase shift. With suitable sensors 1561-1567, the airborne optical sensing system can provide indication of a wide variety of parameters associated with aircraft 1505 including, without limitation: interior, skin, or exterior temperature; interior or exterior pressure; fuel level; acoustic noise level; vibration; attitude (e.g. with a gyroscopic sensor); smoke; air pollution; engine or electrical parameters; condition monitoring; or airspeed.

Although aircraft 1505 is depicted as a fixed wing airplane, this is not a requirement. Similar systems can be deployed in a wide range of airborne applications, including manned and unmanned aircraft (including helicopters, drones, balloons, satellites, or airships) used in passenger, commercial, military, surveillance, remote sensing, or telecommunication applications.

Example Downhole System

Figure 16:
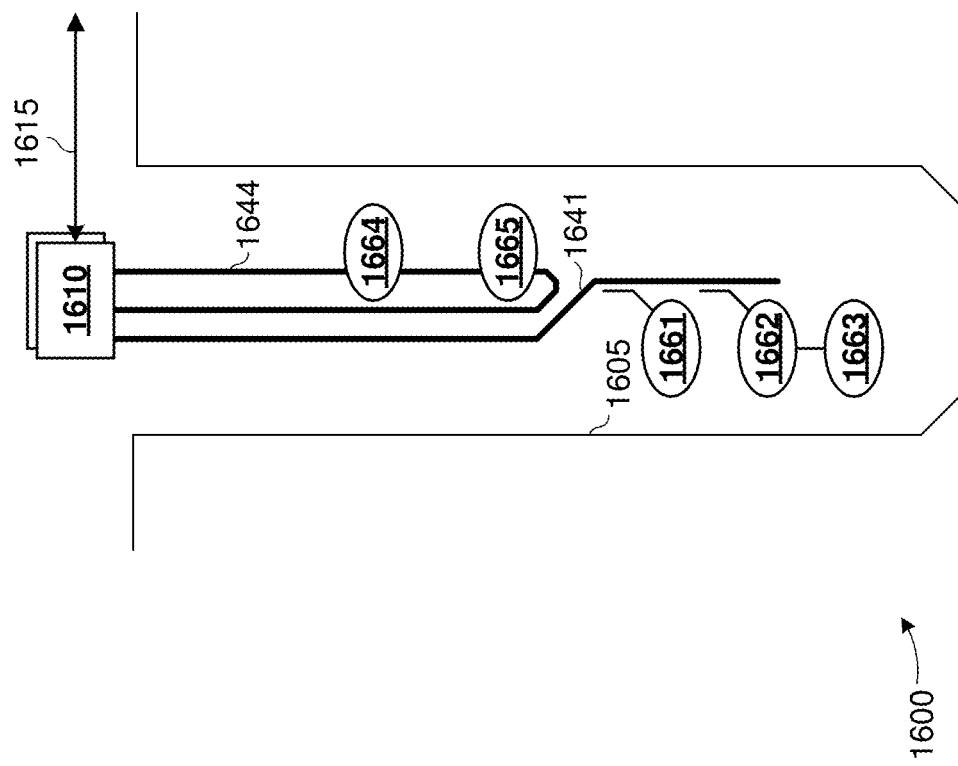
FIG. 16 is a diagram of a downhole optical sensing system according to the disclosed technologies.

FIG. 16 is a diagram 1600 of a downhole optical sensing system according to the disclosed technologies. One or more interferometers 1610 can be deployed proximate to a shaft 1605 and coupled to one or more sensors 1661-1665 distributed along the shaft 1605. An interferometer 1610 can incorporate nonlinear lightguides and other blocks as describe in context of FIG. 14 or elsewhere herein. Fiber bundles 1641, 1644 can route light components among the optical sensors 1661-1665. Varying configurations of fibers and sensors are possible, similar to those described in context of FIG. 15. As illustrated, sensors 1664-1665 can be transmission mode sensors, while sensors 1661-1663 can be reflection mode sensors. Couplers 1647-1648 can be used to tap light components at arbitrary positions along one or more fibers of bundle 1641. Measurement and control of instruments 1610 can be communicated over a wired, wireless, or optical network 1615 to or from a local or remote control room or monitoring station.

Similar to FIG. 15, each of sensors 1661-1665 can impose a sensed phase shift on a transiting component of light, which can be measured by a coupled interferometer 1610. With suitable sensors 1661-1665, the downhole optical sensing system can provide indication of a wide variety of environmental parameters including, without limitation: temperature; air, gas, or liquid pressure; acoustic noise level; vibration; chemical concentration; or radioactivity.

The shaft 1605 can be an oil well, either production or exploratory, a gas well, or a fluid injection or extraction shaft for fracking. Similar systems can be deployed in other subterranean applications, for example storage tanks or access shafts in geologic formations. Further, similar systems can be deployed over long pipelines for transport of petrochemicals or other fluids, or within a refinery or processing plant.

Second Example Device

A second example device is described with reference to FIG. 1. A splitter 130 can be configured to split probe and conjugate modes (components) from a pump mode (component) within a nonlinear medium. A modulator 150 can be coupled to receive one or more of the modes from the splitter at an input port (similar to port 451), and can further be coupled to provide the received modes to an output port (similar to port 459). A given one of the provided modes can incorporate a phase shift not present in the corresponding received mode, the phase shift representing a sensed quantity. A mode coupling amplifier 170 can be situated to receive pump, probe, and conjugate modes, which collectively can include the given mode, with incorporated phase shift, coupled from the output port of the modulator. The pump and conjugate modes can undergo phase-sensitive gain in the mode coupling amplifier 170. The second example device 120 can be used as an interferometer. The phase-sensitive gain, averaged over values of the phase shift, can have a predetermined relationship with a probe gain experienced by the probe mode in the splitter 130.

Numerous variations are possible within the scope of the disclosed technologies, as disclosed herein. For example, the nonlinear medium of splitter 130 can be a glass fiber with third order nonlinear susceptibility. The splitting of modes can occur due to pump-degenerate four-wave mixing. The splitter 130 and mode-coupling amplifier 170 can employ a common gain mechanism. The incorporated phase shift in the given light mode can be provided by an external fiber sensor coupled to the modulator in the light path of the given mode.

Example Experiment

Authors have fabricated an apparatus similar to that of FIG. 1, have performed measurements to confirm operation of the apparatus, as predicted by computer simulations. Lightguides 130, 170 were constructed of identical HNLF fiber having lengths 131, 171 of 98 m and 510 m respectively. The fiber was "ordinary dispersion" fiber, i.e. not dispersion-shifted, having a zero-dispersion wavelength of 1542 nm (corresponding to a frequency of 194.4 THz) and a nonlinearity coefficient gamma of 9.3 $W^{-1}km^{-1}$.

A +12 dBm stabilized CW laser operating at 193.0 THz was used for seed probe lamp 112. Pump lamp 114 was a mode-locked laser operating at 194.05 THz, with pulses of approximately 5 ps flat-top duration at 33.3 MHz, i.e. approximately 0.016% duty cycle, and about 40 dBm (10 W) peak instantaneous power. Optocoupler 116 was implemented as an attenuator and polarization controller (PC) on the pump laser output, a polarization controller on the seed laser output, followed by a 50-50 coupler to mix seed and pump light, and a polarizer on the input to lightguide 130. The polarization controllers were used to align the respective lamp output polarizations with the linear polarization of the polarizer. The pump attenuator was set to about the threshold for onset of self-phase modulation (SPM).

Modulator 150 was implemented using a programmable optical pulse shaper having about 4.5 dB insertion loss. The lengths 131, 171 were chosen to provide a match between probe gain of 15 dB and average phase-sensitive gain in lightguide 170, to counteract the insertion loss of modulator 150, and for the light power levels described.

The output of lightguide 170 was sent through a bandpass filter and detected with an avalanche photodiode for normal operation, and with a balanced photodiode pair for testing noise levels. Separately, optical spectra were observed with an optical spectrum analyzer set to a 2 GHz resolution bandwidth.

In this experiment, a maximum fringe visibility of 97% was experimentally confirmed, with >90% visibility over a 554 GHz conjugate component bandwidth. The bandwidth is sufficiently wide to support sensing with multiple sensors in parallel, at respective wavelengths, as described in context of FIG. 9. The noise characteristics and fringe shape were confirmed against simulations.

Further details have been provided in the authors' publication Lukens et al. "A broadband fiber-optic nonlinear interferometer," vol. 113, article 091103 (2018), incorporated herein by reference.

A Generalized Computer Environment

Figure 17:
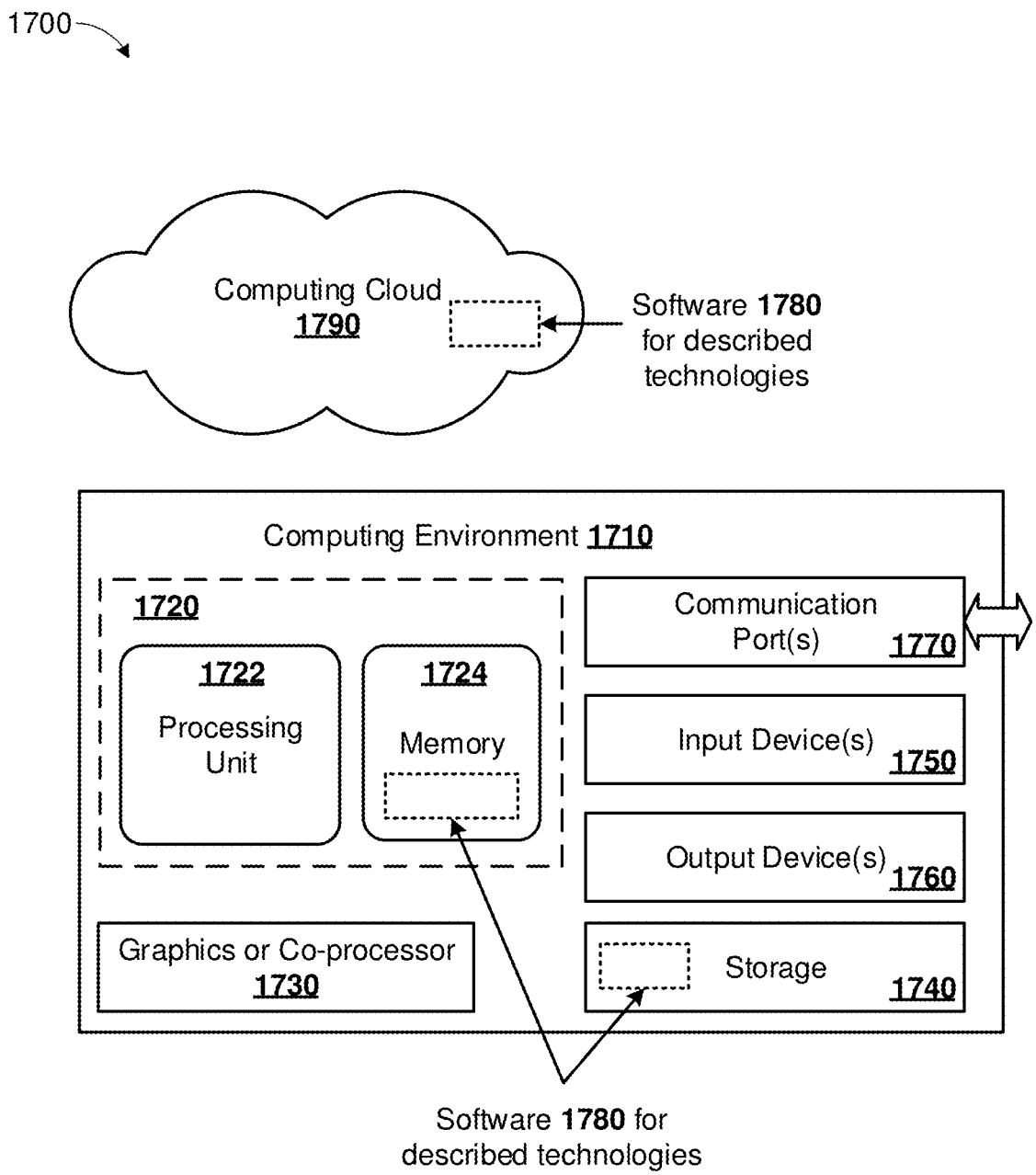
FIG. 17 illustrates a generalized example of a suitable computing environment in which described embodiments, techniques, and technologies pertaining to a disclosed nonlinear optical device can be implemented.

FIG. 17 illustrates a generalized example of a suitable computing system 1700 in which described examples, techniques, and technologies for a nonlinear optical interferometer can be implemented. The computing system 1700 is not intended to suggest any limitation as to scope of use or functionality of the present disclosure, as the innovations can be implemented in diverse general-purpose or special-purpose computing systems. The computing system 1700 can control a disclosed optical apparatus or optical sensing system; or can acquire, process, output, or store measurement data.

With reference to FIG. 17, computing environment 1710 includes one or more processing units 1722 and memory 1724. In FIG. 17, this basic configuration 1720 is included within a dashed line. Processing unit 1722 can execute computer-executable instructions, such as for control or data acquisition as described herein. Processing unit 1722 can be a general-purpose central processing unit (CPU), a processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730. The memory 1724 can also store control parameters, calibration data, measurement data, or database data. The memory 1724 can also store configuration and operational data.

A computing system 1710 can have additional features, such as one or more of storage 1740, input devices 1750, output devices 1760, or communication ports 1770. An interconnection mechanism (not shown) such as a bus, controller, or network interconnects the components of the computing environment 1710. Typically, operating system software (not shown) provides an operating environment for other software executing in the computing environment 1710, and coordinates activities of the components of the computing environment 1710.

The tangible storage 1740 can be removable or non-removable, and includes magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein. Storage 1740 can also store image data, measurement data, configuration data, or other databases or data structures described herein.

The input device(s) 1750 can be a mechanical, touch-sensing, or proximity-sensing input device such as a keyboard, mouse, pen, touchscreen, or trackball, a voice input device, a scanning device, or another device that provides input to the computing environment 1710. The output device(s) 1760 can be a display, printer, speaker, optical disk writer, or another device that provides output from the computing environment 1710. Input or output can also be communicated to/from a remote device over a network connection, via communication port(s) 1770.

The communication port(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1700 can also include a computing cloud 1790 in which instructions implementing all or a portion of the disclosed technology are executed. Any combination of memory 1724, storage 1740, and computing cloud 1790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "acquire," "adjust," "align," "analyze," "apply," "calibrate," "configure," "detect," "determine," "display," "estimate," "form," "generate," "output," "process," "produce," "read," "store," "transform," "trigger," "tune," and "use" to describe operations performed or controlled by a computer in a computer system. These terms are high-level descriptions of the actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The term computer-readable storage media does not include signals and carrier waves. In addition, the term computer-readable storage media does not include communication ports (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples of the disclosed subject matter and should not be taken as limiting the scope of the claims. Rather, the scope of the claimed subject matter is defined by the following claims. We therefore claim as our invention all that comes within the scope of these claims and their equivalents.

We claim:

1. A method, comprising:
    amplifying seed probe light by a first gain in a first nonlinear lightguide to form first mixed light comprising first probe, first pump, and first conjugate components,
        wherein the first nonlinear lightguide is a splitter which further splits, in a nonlinear medium of the first nonlinear lightguide, a probe mode comprising the first probe component, and a conjugate mode comprising the first conjugate component, from a pump mode comprising the first pump component;
    receiving, at a modulator, one or more modes among the probe mode, the conjugate mode, and the pump mode;
    providing, by the modulator, the received one or more modes to an output port of the modulator coupled to a second nonlinear lightguide,
        wherein at least a given mode of the provided one or modes incorporates a phase shift associated with a sensed quantity;
    providing second mixed light comprising second probe, second pump, and second conjugate components to the second nonlinear lightguide,
        wherein the components of the second mixed light have phase relationships with respective components of the first mixed light, one of the phase relationships being the phase shift associated with the sensed quantity, and
        wherein the given mode comprises at least one of the second probe, second pump, or second conjugate components of the second mixed light; and
    amplifying, with phase-sensitive gain within the second nonlinear lightguide, the second probe and second conjugate components, a length of the first or the second nonlinear lightguide being selected to match an average of the phase-sensitive gain with the first gain;
        wherein the second nonlinear lightguide is a mode-coupling amplifier which causes the probe mode, comprising the second probe component, and the conjugate mode, comprising the second conjugate component, to undergo the phase-sensitive gain within a nonlinear medium of the second nonlinear waveguide.

2. The method of claim 1, further comprising:
    splitting a given component from other components of the first mixed light,
        wherein the given component and the other components are selected from the first probe, the first pump, and the first conjugate components; and
    recombining the given component with the other components, wherein the recombined given component incorporates the phase shift associated with the sensed quantity.

3. The method of claim 2, further comprising, by an intrinsic fiber sensor:
    receiving the split given component;
    applying the phase shift to the given component responsive to the sensed quantity; and
    providing the recombined given component.

4. The method of claim 2, further comprising:
    multiplexing the seed probe light between a plurality of wavelengths; and
    correspondingly multiplexing the given component between respective sensing elements for the plurality of wavelengths, wherein the sensed quantity is multiplexed between a respective plurality of quantities.

5. The method of claim 1, further comprising:
    detecting one or more of the second probe component or the second conjugate component to determine the phase shift.

6. The method of claim 5, further comprising:
    applying an auxiliary phase sweep to a selected one of the second mixed light components to sweep a fringe pattern; and
    determining a point of the auxiliary phase sweep at which a target point of the fringe pattern is obtained, wherein the determined phase shift is evaluated as a linear transformation of the determined point.

7. The method of claim 5, wherein the detecting is performed with a photosensor, the method further comprising:
    applying a compensatory phase shift to a selected one of the second mixed light components based on feedback from an output of the photosensor, to obtain a target fringe position at the photosensor, wherein the determined phase shift is evaluated as a linear transformation of the compensatory phase shift.

8. The method of claim 1, wherein the length of the second nonlinear lightguide is greater than the length of the first nonlinear lightguide.

9. The method of claim 1, wherein:
    the nonlinear medium of the first nonlinear lightguide is a fiber with third order nonlinear susceptibility; and
    the splitting occurs due to pump-degenerate four-wave mixing.

10. The method of claim 1, wherein the amplifying in the first nonlinear lightguide and the amplifying in the second nonlinear lightguide employ a common gain mechanism.

11. The method of claim 1, wherein the incorporated phase shift is provided by an external fiber sensor coupled to the modulator in a path of the given mode.

12. The method of claim 1, wherein the given mode, in which the phase shift associated with the sensed quantity is incorporated, is the probe mode or the conjugate mode.

13. A method comprising:
    amplifying seed probe light, received from a first light source, in a first nonlinear lightguide having a first length, to form first mixed light comprising first probe, first pump, and first conjugate components, wherein the first probe component has a first gain relative to the received seed probe light;
    transforming the first probe, first pump, and first conjugate components with respective phase shifts, into second probe, second pump, and second conjugate components of second mixed light, wherein two of the phase shifts are associated with a common sensed quantity; and
    providing the second mixed light to a second nonlinear lightguide having a second length;
    amplifying, with phase-sensitive gain within the second nonlinear lightguide, the second probe and second conjugate components; and
    wherein the second length is greater than the first length such that the phase-sensitive gain, averaged over the phase shifts associated with the common sensed quantity, matches the first gain of the first probe component relative to the received seed probe light.

14. The method of claim 13, wherein the two phase shifts are matched and are in the second probe and the second conjugate components.

15. The method of claim 13, further comprising differentially detecting the common sensed quantity based on the two phase shifts.

16. The method of claim 13, wherein:
the first nonlinear lightguide comprises a nonlinear fiber medium with third order nonlinear susceptibility, and pump-degenerate four-wave mixing within the nonlinear fiber medium causes splitting of the first pump component into the first probe component and the first conjugate component.

17. The method of claim 13, wherein the first nonlinear lightguide and the second nonlinear lightguide respectively provide the first gain and the phase-sensitive gain through a common gain mechanism.

18. The method of claim 13, wherein the two phase shifts associated with the common sensed quantity are provided by respective fiber sensors.

19. The method of claim 13, further comprising:
detecting one or more of the second probe component or the second conjugate component to determine the common sensed quantity.

20. The method of claim 19, wherein the detecting is performed with a photosensor, the method further comprising:
applying a compensatory phase shift to a selected one of the components of the second mixed light, based on feedback from an output of the photosensor, to obtain a target fringe position at the photosensor, wherein the determined common sensed quantity is evaluated as a linear transformation of the compensatory phase shift.

* * * * *